US010910953B2

United States Patent
Mnich

(10) Patent No.: US 10,910,953 B2
(45) Date of Patent: Feb. 2, 2021

(54) WELDING POWER SUPPLY WITH EXTENDED VOLTAGE CHARACTERISTIC

(71) Applicant: ESAB AB, Gothenburg (SE)

(72) Inventor: Andrzej Mnich, Opole (PL)

(73) Assignee: ESAB AB, Gothenburg (SE)

( * ) Notice: Subject to any disclaimer, the term of this patent is extended or adjusted under 35 U.S.C. 154(b) by 137 days.

(21) Appl. No.: 15/990,973

(22) Filed: May 29, 2018

(65) Prior Publication Data

US 2018/0367050 A1  Dec. 20, 2018

Related U.S. Application Data

(63) Continuation of application No. PCT/IB2016/057363, filed on Dec. 5, 2016.

(30) Foreign Application Priority Data

Dec. 14, 2015 (WO) .................. PCT/IB2015/059601

(51) Int. Cl.
    *H02M 3/33* (2006.01)
    *B23K 9/09* (2006.01)
    (Continued)

(52) U.S. Cl.
    CPC ......... *H02M 3/33576* (2013.01); *B23K 9/092* (2013.01); *B23K 9/1043* (2013.01);
    (Continued)

(58) Field of Classification Search
    CPC .... B23K 9/092; B23K 9/1043; B23K 9/1062; B23K 9/16; B23K 11/24; B23K 11/25;
    (Continued)

(56) References Cited

U.S. PATENT DOCUMENTS

| 5,229,567 A | 7/1993 | Kobayashi et al. |
| 2009/0195231 A1 | 8/2009 | Noon et al. |

(Continued)

FOREIGN PATENT DOCUMENTS

| CN | 102315698 A | 1/2012 |
| CN | 105075092 | 11/2015 |

(Continued)

OTHER PUBLICATIONS

Machine Translation of Wataya JP2005-103569, performed Mar. 13, 2020 (Year: 2005).*

(Continued)

*Primary Examiner* — Brian W Jennison
(74) *Attorney, Agent, or Firm* — Edell, Shapiro & Finnan, LLC

(57) ABSTRACT

An apparatus to provide welding power. The apparatus may include a direct current-alternate current (DC-AC) power converter to output a primary current and a transformer stage. The transformer stage may include at least one power transformer to receive the primary current from the (DC-AC) power converter on a primary side of the transformer stage and to output a first voltage through a first rectifier and a first set of secondary windings disposed on a secondary side of the transformer stage. The transformer stage may further include an auxiliary set of secondary windings disposed on the secondary side to output a second voltage. The apparatus may also include a pair of active unidirectional switches disposed on the secondary side to receive the second voltage from the auxiliary set of secondary windings.

15 Claims, 25 Drawing Sheets

(51) Int. Cl.
  *H02M 3/335* (2006.01)
  *B23K 9/10* (2006.01)
  *B23K 9/16* (2006.01)
  *H02M 1/08* (2006.01)
  *H02M 3/28* (2006.01)
  *H02M 1/00* (2006.01)

(52) U.S. Cl.
  CPC .............. *B23K 9/1062* (2013.01); *B23K 9/16* (2013.01); *H02M 1/083* (2013.01); *H02M 3/285* (2013.01); *H02M 2001/0009* (2013.01)

(58) Field of Classification Search
  CPC .. B23K 9/073; H02M 3/33576; H02M 1/083; H02M 3/285; H02M 2001/0009
  See application file for complete search history.

(56) References Cited

U.S. PATENT DOCUMENTS

| | | |
|---|---|---|
| 2010/0013305 A1 | 1/2010 | Heineman |
| 2012/0081933 A1 | 4/2012 | Garrity |
| 2012/0081934 A1 | 4/2012 | Garrity et al. |
| 2012/0275197 A1 | 11/2012 | Yan et al. |
| 2013/0051083 A1* | 2/2013 | Zhao .................. H02J 50/12 363/17 |
| 2014/0374398 A1 | 12/2014 | Manthe |
| 2015/0029758 A1 | 1/2015 | Jacobson et al. |

FOREIGN PATENT DOCUMENTS

| | | |
|---|---|---|
| JP | 2000023455 A | 1/2000 |
| JP | 2005103569 A | 4/2005 |
| WO | 2015040517 | 3/2015 |

OTHER PUBLICATIONS

Machine Translation of Zhao JP 2000-023455, performed Mar. 13, 2020 (Year: 2000).*

Examination Report No. 1 from the Australian Government/IP Australia for Australian Patent Application No. 2016372793 dated Nov. 26, 2018, 4 pages.

Extended European Search Report for European Patent Application No. 19203571.5 from the European Patent Office dated Jan. 29, 2020, 8 pages.

Chinese Office Action in corresponding Chinese Application No. 201680074693.6, dated Jun. 28, 2019, 24 pages with English Translation.

International Preliminary Report and Written Opinion of International Application PCT/IB2015/059601 dated Jun. 19, 2018, 8 pages.

International Preliminary Report and Written Opinion of International Application PCT/IB2016/057363 dated Jun. 19, 2018, 10 pages.

Notification of the Second Office Action for Chinese Patent Application No. 201680074693.6 dated Feb. 3, 2020 with English translation, 7 pages.

* cited by examiner

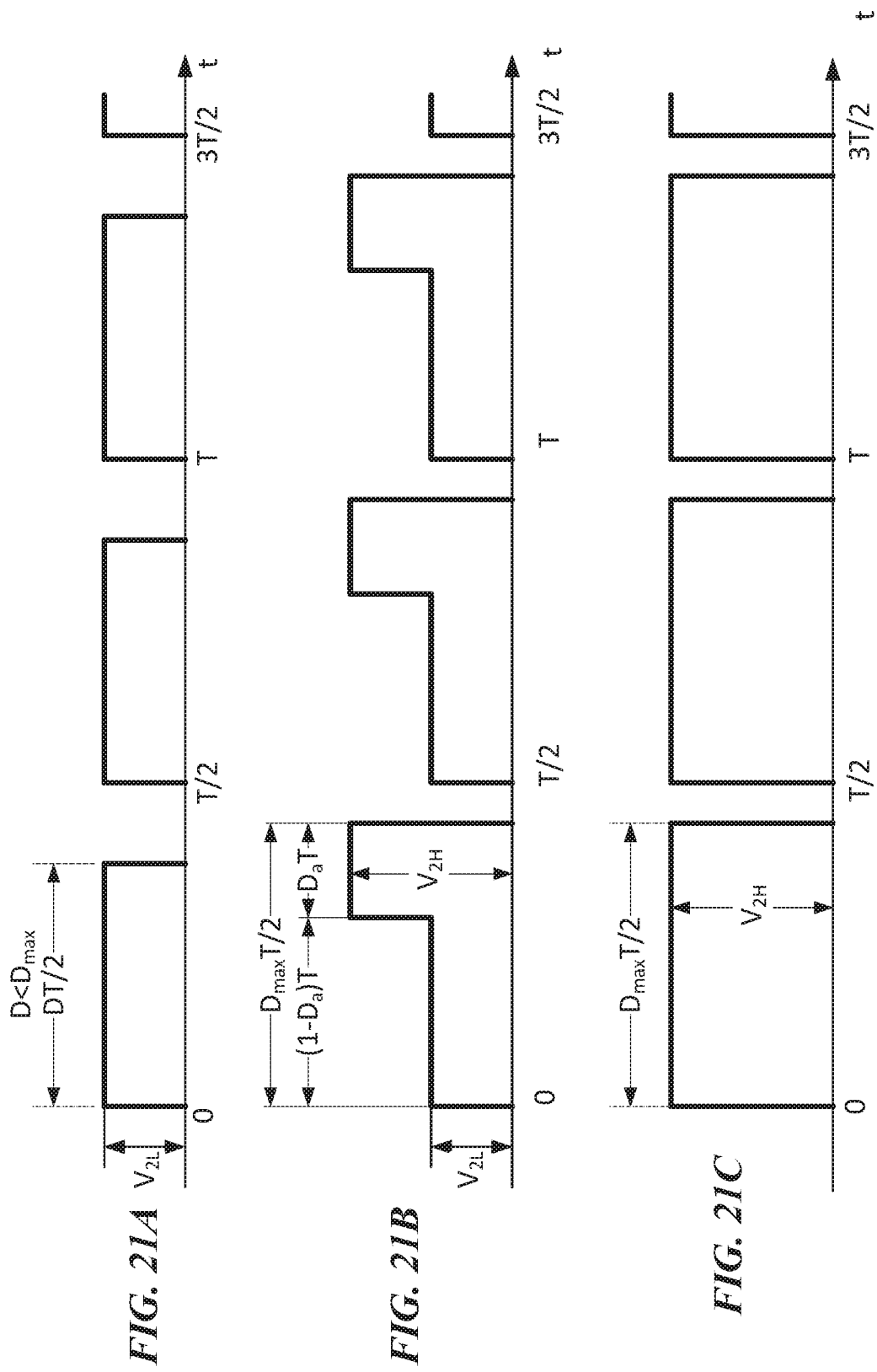

WELDING POWER SUPPLY WITH EXTENDED VOLTAGE CHARACTERISTIC

CROSS-REFERENCE TO RELATED APPLICATIONS

This is a Continuation of PCT/IB2016/057363 filed on Dec. 5, 2016, which PCT claims the benefit of PCT/IB2015/059601 filed Dec. 14, 2015, and both of which are incorporated by reference herein in their entirety.

TECHNICAL FIELD

The present embodiments are related to power supplies for welding type power, that is, power generally used for welding, cutting, or heating.

BACKGROUND

In welding apparatus, power supplies are often configured to deliver constant voltage output while covering a certain range of output current. The static output volt-amp characteristic may include a horizontal line representing constant voltage and a vertical line, corresponding to the current limit. Moreover, welding power supplies, in particular, switched mode power supplies, have certain requirements, imposed by physics of welding process. Instead of delivering a current-voltage-characteristics in form of a horizontal and vertical line, a welding power supplies may be more useful if capable of covering the range from almost zero to a maximum voltage and from almost zero to a maximum current. In other words, a welding power supply may be targeted to cover the entire rectangular plane on the output volt-amp characteristic.

Notably, in operation, it may not be necessary that the maximum voltage and the maximum current are delivered at the same moment. The control system of a welding power supply may, for example, limit the output voltage at high current and limit the output current at high voltage. The control system may be configured to generate a power limitation having a shape such as a hyperbola or other complex current-voltage limitations, created by feedback and feedforward control circuits. These limitations in the control are merely superimposed over limits defined by the invariable ratio of the transformer. If covering the high voltage at low current is targeted for a given application, this leads to a low transformer ratio, while power conversion may be ineffective at big currents where high voltage is not needed. These considerations may decrease the effectiveness of a power supply design, especially in the case of welding by means of cellulosic electrodes. Welding using cellulosic electrodes entails very high current at short circuits, and a long extension of the electric arc, thus entailing high voltage at low or moderate currents.

Any solution that provides multiple power supplies to address the aforementioned problems of providing a targeted output range of voltage and current is to be compared on a practical basis with a simple approach, where the output voltage-ampere characteristic is limited just by a control system. In general, there is no obvious conclusion whether designs having two power supplies are more or less economically effective than a solution having the current-voltage limitations imposed by a control system. The best choice may depend on a particular solution or application and on the relation between the rated current operating point and the voltage margin in the low current region.

It is with respect to these and other considerations that the present disclosure is provided.

BRIEF SUMMARY

In one embodiment, an apparatus to provide welding power. The apparatus may include a direct current-direct current (DC-DC) power converter. The DC-DC converter may comprise direct current to alternate current converter (DC-AC) to output a primary current and a transformer stage. The transformer stage may include at least one power transformer to receive the primary current from the DC-AC power converter on a primary side of the transformer stage and to output a first voltage through a first set of secondary windings disposed on a secondary side of the transformer stage. The first set of secondary winding may output the current to the first rectifier that converts alternate current to direct current. The apparatus may further include an auxiliary set of secondary windings disposed on the secondary side to output a second voltage; an auxiliary rectifier and a pair of active switches disposed on the secondary side to receive the second voltage from the auxiliary set of secondary windings.

In a further embodiment, an apparatus to provide welding power may include a main DC-DC power converter, where the main power converter has a first output. The apparatus may also include a main power transformer coupled to receive the first output at main primary windings of the main power transformer and to generate a main power output through main secondary windings of the main power transformer and further through the main output rectifier. The apparatus may further include an auxiliary DC-DC power converter, where the auxiliary DC-AC power converter having a second output, and an auxiliary power transformer coupled to receive the second output at auxiliary primary windings of the auxiliary power transformer, and to generate an auxiliary power output through auxiliary secondary windings of the auxiliary power transformer and further through the auxiliary and main output rectifiers. The outputs of the rectifiers may be electrically connected in series. The main DC-DC power converter and the auxiliary DC-DC power converter may be a two-switch forward converter or other power converter operating with limited duty cycle of PWM signal and then output rectifiers may be connected in parallel.

In another embodiment, a method of controlling welding power may include sending a first and second pulse width modulated (PWM) signals to a DC-AC power converter-to output a primary current to a primary side of a main power transformer stage. The method may further include measuring the primary current, the secondary current, various currents in separate secondary circuits, the combination and derivatives of the aforementioned current measurements or the reference current from the internal feedback loop, to generate a sensed current value; and when the sensed current value is below a certain first threshold value, activating a first secondary switch disposed on a secondary side of the main power transformer stage using a third a fourth PWM signal, respectively. The method may further include the modulation of a third and fourth PWM by the principle of the leading edge modulation wherein the leading edge is delayed and the delay decreases from the maximum at the first threshold value of the sensed current down to zero at another second threshold value of the sensed current.

In another embodiment, a method of controlling welding power may include sending PWM signals to a two-switch forward DC-AC power converter or another power converter operating with the limited maximum duty cycle to output a primary current to a primary side of a main power transformer stage. The method may further include measuring the primary current, the secondary current, various currents in separate secondary circuits, the combination and derivatives of the aforementioned current measurements or the reference current from the internal feedback loop, to generate a sensed current value; and when the sensed current value is below a first threshold value, activating the second two-switch forward DC-AC power converter or another power converter operating with the limited maximum duty cycle to output a primary current to a primary side of a auxiliary power transformer stage using another set of PWM signals.

The method may further include the modulation of PWM control of the second DC-AC converter by the principle of the leading edge and lagging modulation in a way that the leading edge is delayed and the delay decreases from the maximum at the first threshold value of the sensed current down to zero at another second threshold value of the sensed current.

DESCRIPTION OF FIGURES

FIG. 21A-21C depicts output voltage timing diagrams at different output voltages according to embodiments of the disclosure.

DESCRIPTION OF EMBODIMENTS

Figure 1:
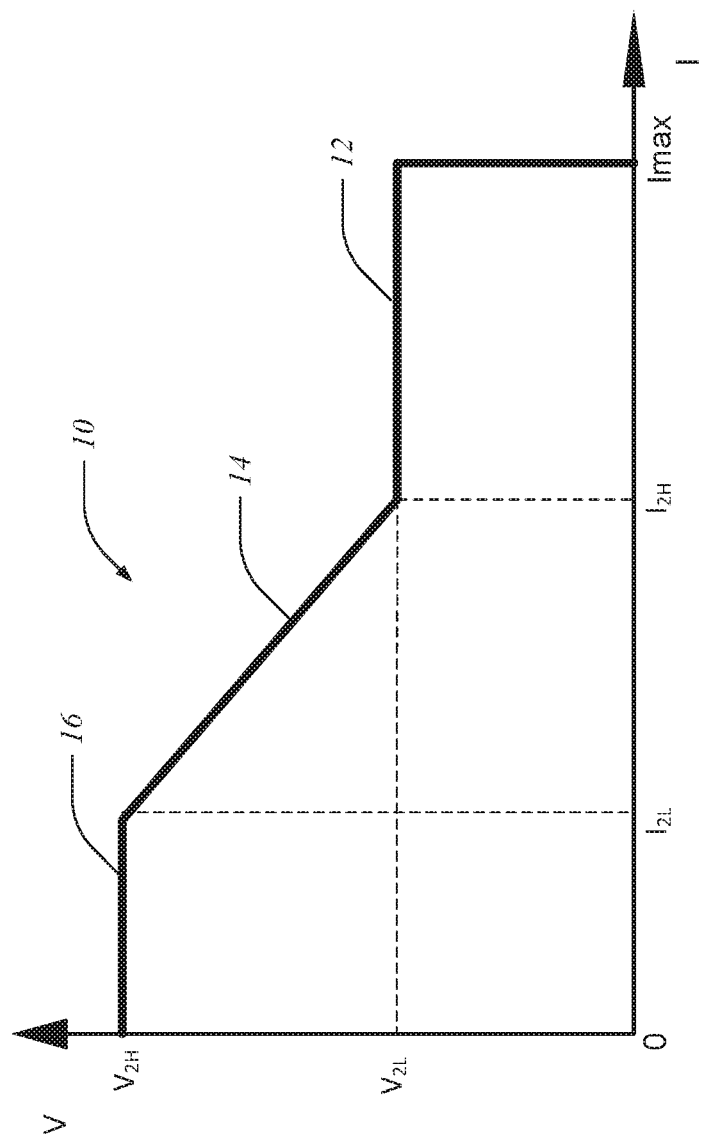
FIG. 1 depicts a circuit diagram of an exemplary maximum voltage-current characteristic output by embodiments of the disclosure.

The present embodiments provide improvements over known apparatus used to provide welding type power, which may be referred to herein as "welding apparatus." In accordance with various embodiments, welding power supplies are provided with extended voltage characteristics.

In various embodiments, a DC-DC power converter (or power converter) is provided based on a full bridge or equivalent topology (such as a half-bridge, three level, double two-switch forward). In various embodiments, the power converter may be equipped with active switches on the secondary side of the converter, where the active switches introduce additional voltage to an output circuit, the additional voltage being generated from additional windings, either of the same transformer or from an additional transformer. In some embodiments, the additional transformer is connected to the same voltage converter. In various additional embodiments, a main power converter is a two-switch forward converter or other power converter operating with the limited maximum PWM duty cycle. Extended voltage is provided by application of an additional low power converter, operating in opposite phase timing with respect to the main converter. The auxiliary power converter is a two-switch forward converter or other power converter operating with the limited maximum PWM duty cycle. As an example, an auxiliary power converter may be configured to receive a set of PWM signals having a first phase and the main power converter is configured to receive a set of PWM signals having a second phase opposite the first phase.

Various embodiments of the disclosure may operate using a same general control principle. In particular, the main converter and its switches may operate with pulse width modulation (PWM) control, in particular the modulation of the lagging edge of the active energy transfer pulse. In different methods of the disclosure, PWM feedback control can be applied so the lagging edge is modulated. In different variants, control may operate under peak current mode, average current mode, constant on-time, or voltage control mode. For control of additional switches (in an additional converter, or on the secondary side) the leading edge may also be modulated, by the implementation of controlled time delay. In some embodiments, the delay may be inversely proportional to the actual primary current, secondary current, and combinations of different currents in the converter or the reference current from the internal feedback loop.

In operation, for current greater than a certain high threshold value, the time delay of the leading edge of the operation of the additional switches may be more than the half of the switching period, meaning the additional switches are not activated at all. In accordance with various embodiments, for current lower than the high threshold value the delay is proportionally decreased and decreases to zero at a certain low threshold value of the current. Below the low threshold value of current additional switches may be activated without delay. In various embodiments, the lagging edge of the control signal of the auxiliary switches may be modulated in the same way as for the switches of the main converter, by the same control principle. In particular embodiments where the topology includes secondary switches just the leading edge may be modulated, which may be more effective. In this case the secondary switch may be switched off at a given time after the beginning of the opposite phase. Accordingly, the switching off process is carried out with no current (zero current switching ZCS).

In the range of current values below the high threshold value $I_{2H}$ and the output voltage below a certain level, the apparatus is capable of providing a target voltage level while not using additional components. In such instances additional switches or an auxiliary converter may be switched off by a discrete operation, or, by the continuous operation through the gradual increase of the delay of the leading edge of the control signal of the auxiliary switches or auxiliary converter.

FIG. 1 depicts general-voltage-current characteristics provided by apparatus arranged according to the present embodiments. The FIG. 1 shows an exemplary simplified maximum average voltage-current curve (VI) 10 generated by apparatus of the embodiments of the present disclosure. The VI curve 10 includes a low voltage portion 12 where output voltage is maintained at a relatively low value and constant value over a range of current between the maximum current Imax and a certain current value, shown as a first threshold value $I_{2H}$. The VI curve 10 also includes a variable voltage portion 14, where voltage increases with decreasing current between $I_{2H}$ and a second threshold value $I_{2L}$. The VI curve also includes a high voltage portion 16 where the voltage is relatively high and relatively constant below $I_{2L}$.

Figure 2:
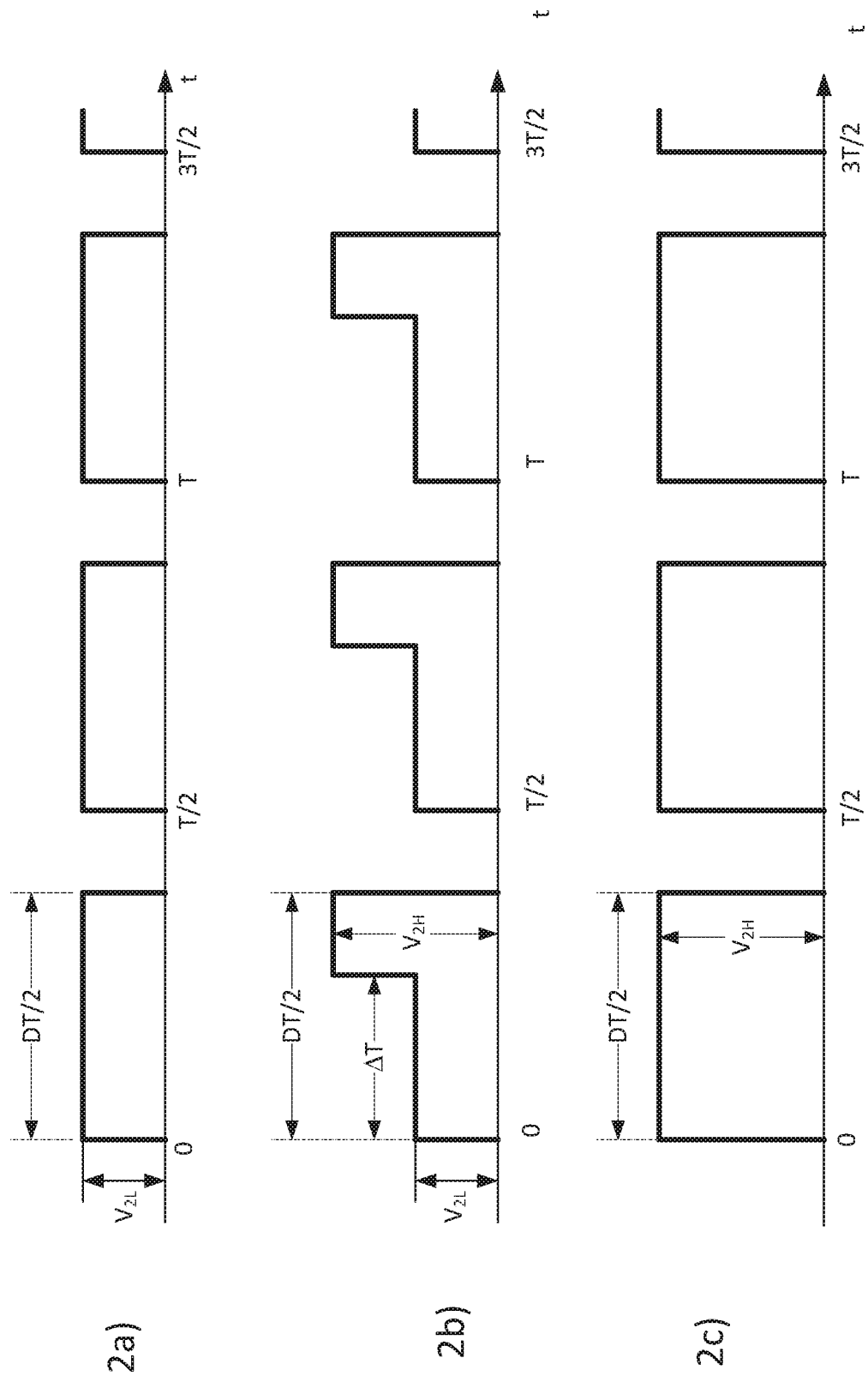
FIG. 2 and FIG. 3 depict the time diagrams of the output voltage of different embodiments of the disclosure.

FIG. 2 shows time diagram of the output voltage in embodiment which employs switches on the secondary side. Diagram 2a) shows the output voltage at current laying over the high threshold value $I_{2H}$. Just the low voltage level $V_{2L}$ appears. The PWM modulation is created on the principle of lagging edge modulation. Diagram 2b) shows the output voltage for current values between the high $I_{2H}$ and low $I_{2L}$ thresholds. The high $V_{2H}$ and low $V_{2L}$ voltage levels are present. The leading and the lagging edges of the high voltage portion are modulated. Diagram 2c) shows the output voltage at current values below the low threshold value $I_{2L}$. Just the high voltage level $V_{2H}$ appears. The PWM modulation is created on the principle of lagging edge modulation.

Figure 3:
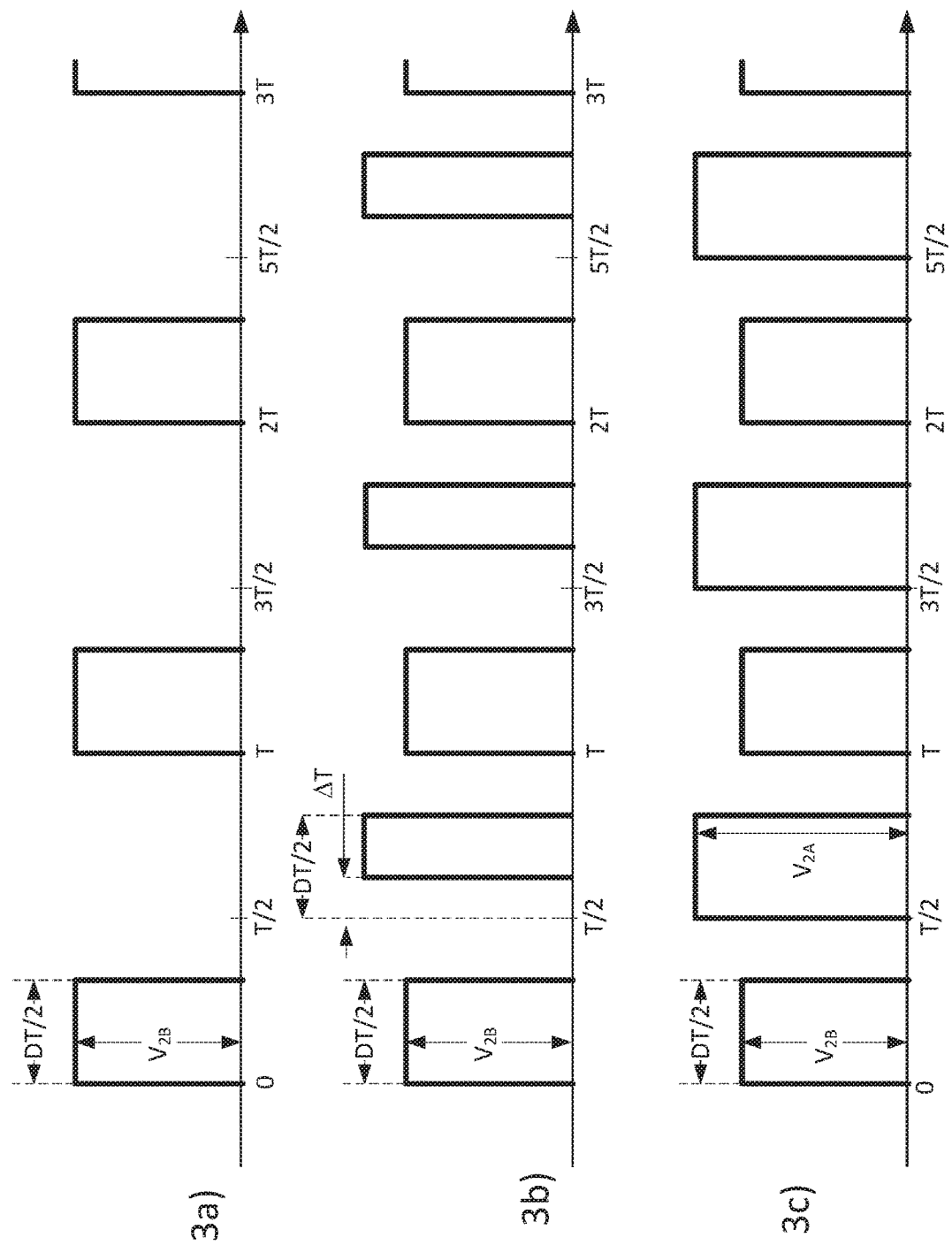

FIG. 3 shows a time diagram of the output voltage in an embodiment employing a main DC-DC power converter is a two-switch forward converter or other power converter operating with the limited maximum PWM duty cycle and similar auxiliary converter. Diagram 3a) shows the output voltage at current greater than the high threshold value $I_{2H}$. The PWM modulation is created on the principle of lagging edge modulation with the limited maximum duty cycle. Diagram 3b) shows the output voltage for current values between the high $I_{2H}$ and low $I_{2L}$ thresholds. Every second pulse is PWM modulated with modulation of the lagging edge. Every second pulse from the series shifted a half of period is PWM modulated with the modulation of the leading and the lagging edges. Diagram 3c) shows the output voltage at current values below the low threshold value $I_{2L}$. The PWM modulation is create on the principle of the lagging edge modulation with double frequency in respect to the instance of the current over high threshold.

Figure 4:
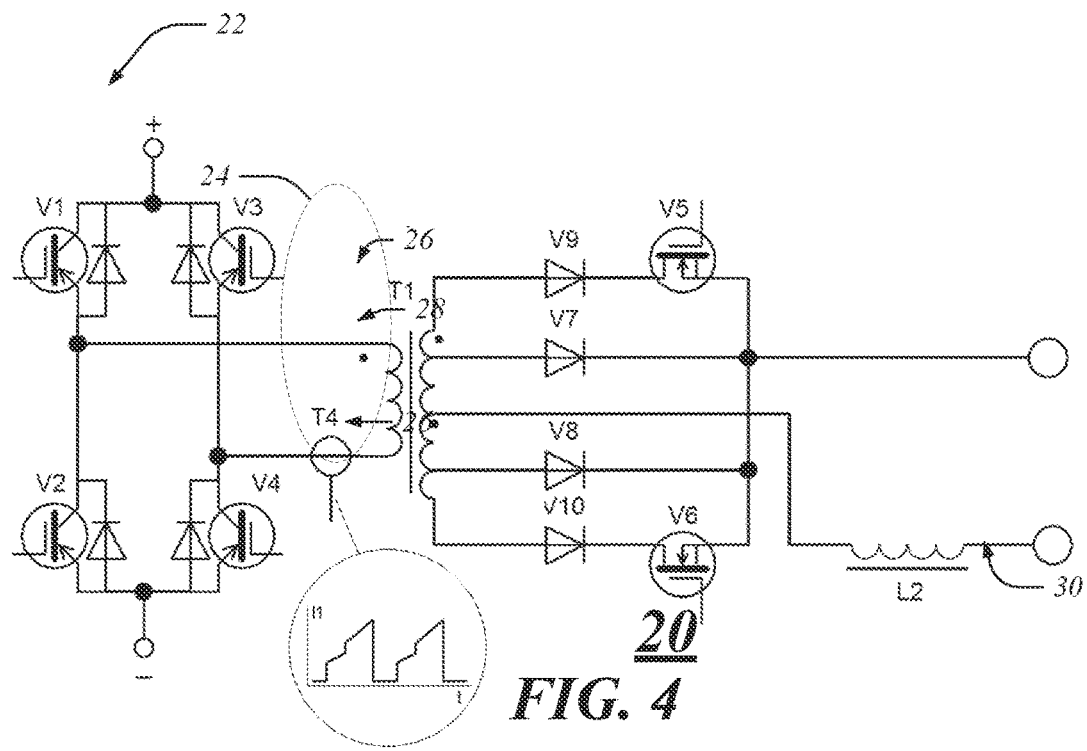
FIG. 4 depicts a circuit diagram of an exemplary apparatus.

FIG. 4 shows a circuit diagram of a power supply 20 according to embodiments of the disclosure. The power supply 20 includes various known components. The components of FIG. 2 and various figures to follow are listed in table I for reference. As shown in FIG. 4, a direct current-alternate current (DC-AC) power converter 22 is arranged with a plurality of switches, shown as V1, V2, V3, V4.

TABLE I

References used in the drawings

| | |
|---|---|
| A1 . . . 4 | Drivers of the main primary switches |
| A11 . . . 13 | Summing nodes |
| A14 | Amplifier/attenuator |
| A15 | Leading edge modulation comparator |
| A16 | Amplifier/attenuator of the compensation ramp |
| A17 | Average current feedback amplifier |
| A18, 19 | Lagging edge modulation comparators |
| A20 | Feedback amplifier |
| A21 | Current sense amplifier |
| A22 | Primary current sense modifier |
| A23 | Summing node |
| A24 | Integrator or other astatic regulator |
| A5, 6 | Drivers of the auxiliary (secondary or primary) switches |
| A5, 6 | Drivers of the secondary primary switches |

TABLE I-continued

References used in the drawings

| | |
|---|---|
| A7, 8 | Current amplifiers/attenuators |
| A9, 10 | Current sense low pass filters |
| C1 | Capacitor for DC voltage balance |
| D1, 2 | AND logic gates |
| D3, 4 | RS triggers |
| D5 | OR logic gate |
| D6 | Logic inverter |
| D8 | PWM Lagging edge trigger |
| D9 | OR logic gate |
| D10 | Threshold reference pulse generator |
| L2 | Secondary inductor |
| L9, 10 | Commutation inductances (or commutation leakage inductances) |
| N1 | PWM controller |
| S1, 2 | Voltage controlled switches |
| S3 | Voltage controlled switch, normally open |
| S4 | Voltage controlled switch, normally closed |
| T1 | Main converter transformer |
| T2 | Auxiliary converter transformer |
| T3 | Secondary current sensor |
| T4, T14 | Primary current sensors |
| T5, 6 | Secondary auxiliary current sensors |
| V02, 03, 012, 013 | |
| V1 . . . 4 | Primary switches of the main converter |
| V11 . . . 14 | Primary switches of the auxiliary converter |
| V20 | Rectifier function, rectify signal of positive value |
| V21 + V22 | Concurrent rectifier |
| V23 + V24 | Concurrent rectifier |
| V5, 6 | Secondary power switches |
| V7, 8 | Main secondary rectifiers |
| V9 . . . 12 | Auxiliary secondary rectifiers |
| & | And logic function |
| ≥1 | Or logic function |
| COMP | comparator |
| CS | Current sense input |
| Dtsh | Threshold reference value of PWM duty cycle |
| EA | Error amplifier |
| EAO, EAO' | Error amplifier outputs |
| FB_I | Current feedback |
| FB_U | Voltage feedback |
| I1 | Primary current signal |
| I2 | Secondary current signal |
| Iav | Average current reference |
| Ipeak | Peak current reference |
| $I_{2L}$ | Second threshold current value (low) |
| $I_{2H}$ | First threshold current value (high) |
| K1 . . . 4 | Coefficients of amplification/attenuation |
| OSC | Oscillator signal, double frequency of conversion |
| OFF | Disable integrator signal |
| PWM_A | PWM signal phase A, lagging edge modulated |
| PWM_B | PWM signal phase B, lagging edge modulated |
| PWM_C | PWM signal phase A, lagging & leading edge modulated |
| PWM_C' | PWM signal phase A, leading edge modulated |
| PWM_D | PWM signal phase B, lagging & leading edge modulated |
| PWM_D' | PWM signal phase B, leading edge modulated |
| RAMP | Ramp signal from the oscillator |
| RELOAD | Reload signal to integrator |
| V2A | Peak voltage of the auxiliary converter |
| V2B | Peak voltage of the basic converter |
| V2L | Low level of the peak voltage |
| V2H | High level of the peak voltage |
| z1, z 11 | Primary windings |
| z2, z21, z22, z31, z32 | Secondary windings |

In some embodiments these switches may be insulated gate bipolar transistors (IGBT) or MOSFET transistors as in known converters. In the embodiment shown in FIG. 4, the switches may be arranged in a full bridge configuration. The DC-AC power converter 22, acting as a main DC-AC power converter, in this and other embodiments may be arranged to receive a first dc voltage, where the first DC voltage may be a rectified voltage based upon an input voltage from an AC power source (not shown). The DC-AC power converter 22 may output an ac voltage whose magnitude is determined by operation of the switches V1, V2, V3, V4. As detailed below the switches V1, V2, V3, V4, may be controlled by pulse width modulation (PWM) signals generated by a pulse width modulator (not separately shown).

As further shown in FIG. 4, the power supply 20 may further include a transformer stage 24. In various embodiments, the transformer stage 24 may include at least one power transformer to receive the ac voltage on a primary side of the transformer stage and to output a second ac voltage through a first set of secondary windings disposed on a secondary side of the transformer stage. In the particular embodiment illustrated in FIG. 4, just one, main transformer is shown, as T1. As shown in this embodiment the transformer stage 24 includes a first set of secondary windings 28 and an auxiliary set of secondary windings 26. The second set of secondary windings 26 may be employed to extend the voltage range for welding output as detailed below. For example, under certain operation conditions, the first set of secondary windings may output a second ac voltage to rectifier V7, V8 to output dc voltage used for welding, based upon the input received from the DC-AC power converter 22. Under other conditions, a third ac voltage from the auxiliary set of secondary windings 26 may be harnessed to another rectifier to increase the welding dc voltage.

As further illustrated in FIG. 4, the power supply 20 may include a pair of active unidirectional switches disposed on the secondary side to receive the second ac voltage from the auxiliary set of secondary windings 26. This pair of active switches may rectify ac voltage and output the dc voltage to a weld station 30. The first unidirectional active switch is shown as serial connection of rectifier V9 and active switch V5. The second unidirectional active switch is shown as serial connection of rectifier V10 and active switch V6. In general, an active unidirectional switch may be embodied as just one device.

Figure 5:
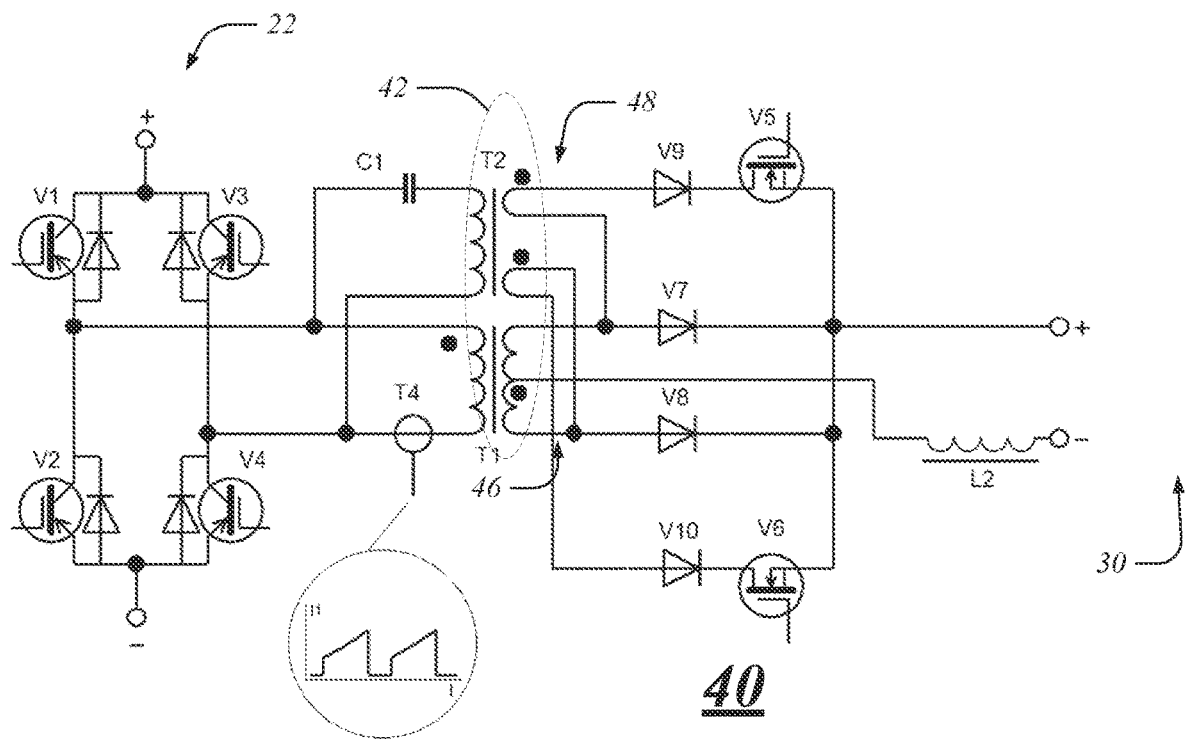
FIG. 5 depicts a circuit diagram of another exemplary apparatus.

FIG. 5 shows a circuit diagram of a power supply 40 according to embodiments of the disclosure. The power supply 40 includes various known components, as set for the in Table I, for example. In the arrangement of FIG. 5, the power supply 40 may include, in addition to the DC-AC power converter 22, a transformer stage 42. In this embodiment the transformer stage 42 includes a main converter transformer T1 and auxiliary converter transformer T2. As shown in this embodiment the transformer stage 42 includes a first set of secondary windings 46 coupled to the main converter transformer T1 and an auxiliary set of secondary windings 48 coupled to the auxiliary converter transformer T2. The second set of secondary windings 48 may be employed to extend the voltage range for welding output as detailed below and generally described above with respect to FIG. 2.

Figure 6:
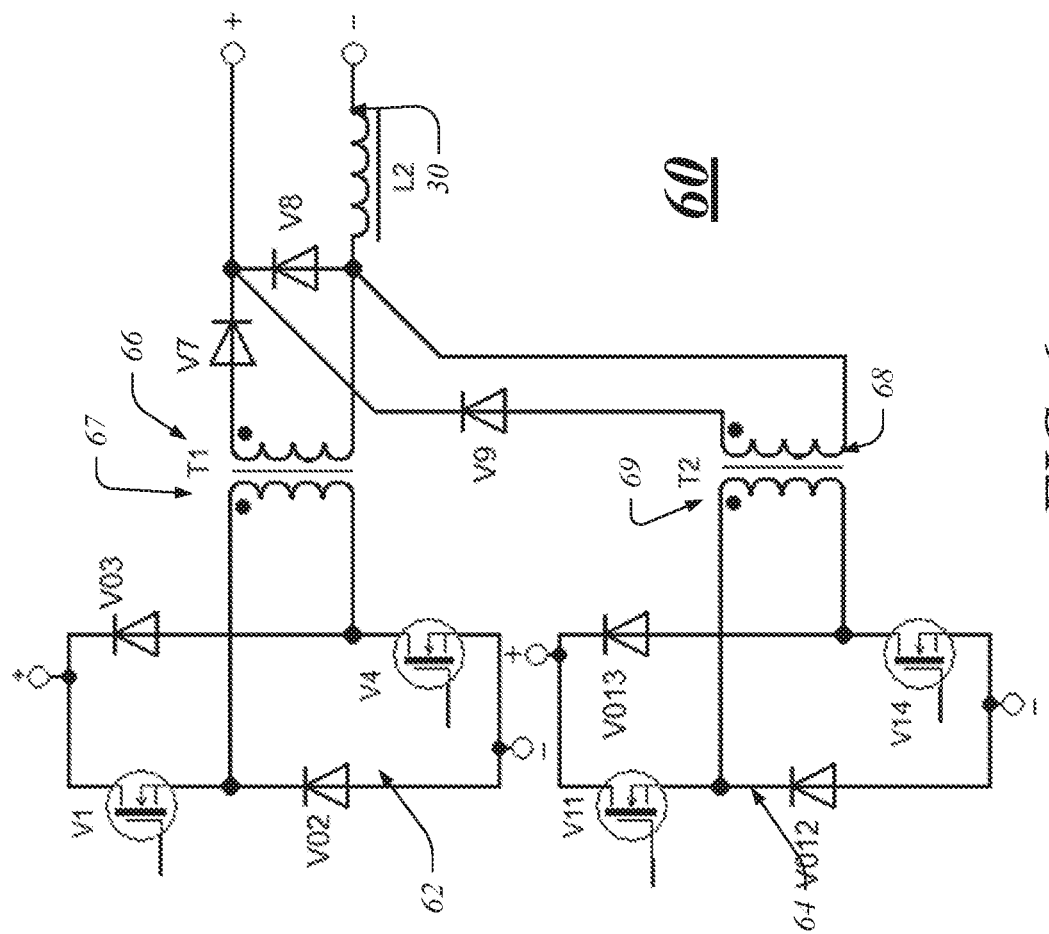
FIG. 6 depicts a circuit diagram of another exemplary apparatus.

FIG. 6 shows a circuit diagram of a power supply 60 according to embodiments of the disclosure. In this embodiment the power supply 60 includes, a main DC-AC power converter 62, arranged as a two-switch forward converter or other power converter operating with the limited maximum PWM duty cycle. In addition, the power supply 60 includes an auxiliary DC-AC power converter 64, which may be a low power converter also arranged as a two-switch forward converter or other power converter operating with the limited maximum PWM duty cycle. The auxiliary DC-AC power converter 64 may operate in different timing phase with respect to the main DC-AC power converter 62. As shown in FIG. 4, the main DC-AC power converter 62 is coupled to a main converter transformer T1 and the auxiliary DC-AC power converter 64 is coupled to the auxiliary converter transformer T2. The main converter transformer T1 may include main primary windings 67 and main secondary windings 66, while the auxiliary converter transformer T2 includes auxiliary secondary windings 69 and auxiliary secondary windings 68. As shown, the main secondary winding is connected to the main rectifier V7 and the auxiliary secondary winding is connected to the auxiliary rectifier V9. Outputs of the rectifiers are connected in parallel. According to its principle of operation, this embodiment contains free-wheeling rectifier V8 on the output. As in the embodiments of FIG. 4 and FIG. 5, additional voltage output through the auxiliary converter transformer T2 may be harnessed under low current conditions to increase the voltage output, as generally shown in FIG. 1.

Figure 7:
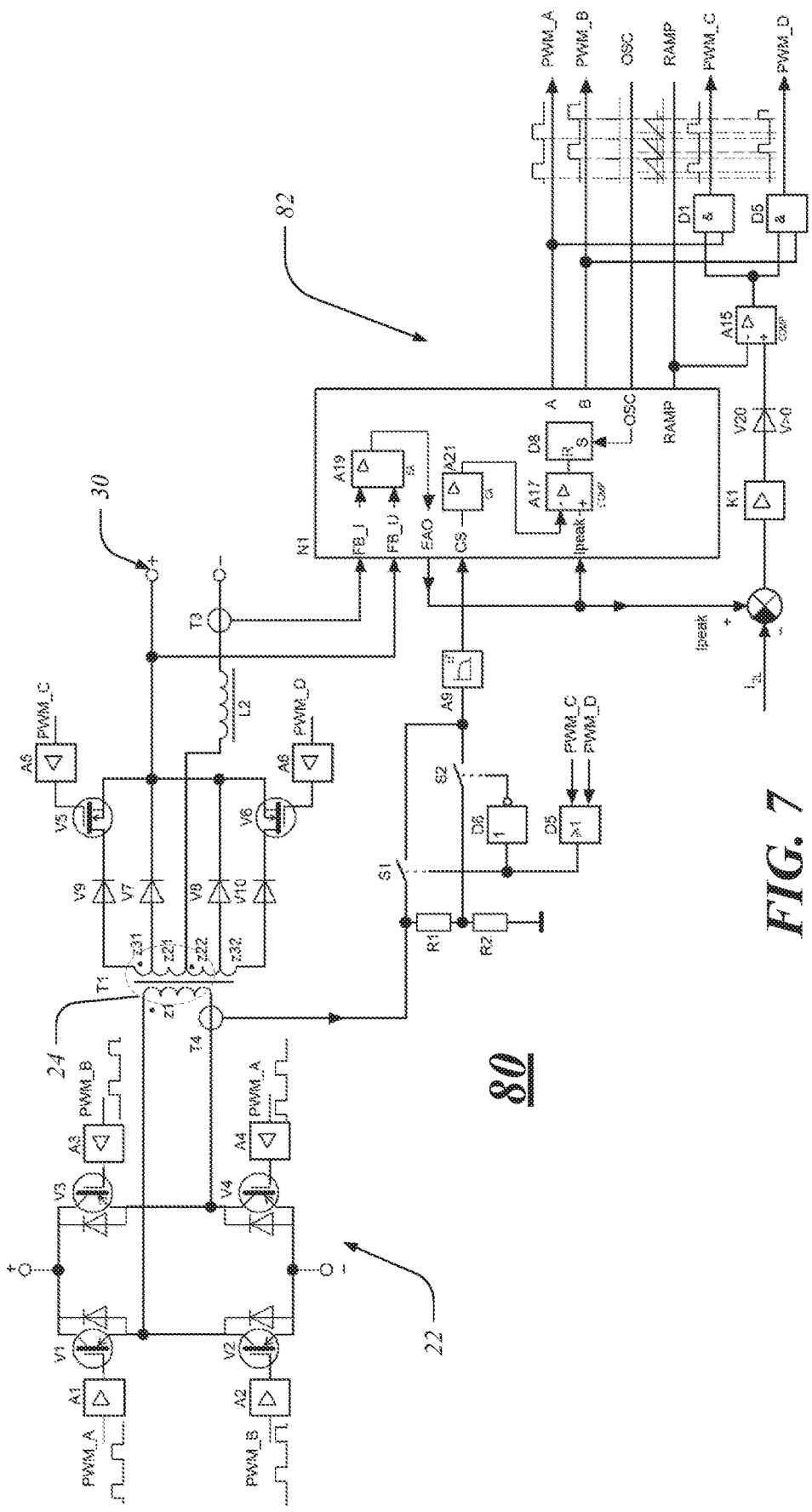
FIGS. 7-18 depict circuit diagrams of exemplary systems according to different embodiments of the disclosure.

FIG. 7 shows a circuit diagram of a power supply 80 according to additional embodiments of the disclosure. The power supply 80 may be arranged generally as shown in FIG. 2, with an additional exemplary control circuit, shown as control circuit 82. As generally discussed above, control of the main converter, DC-AC power converter 22, may be provided using PWM control, in where the lagging edge of a pulse is used to control the output from the DC-AC power converter 22. Additionally, the secondary switches V5, V6 may be controlled using modulation of the leading edge of a pulse. This control is generally shown in the control circuit 82 that outputs a PWM_A signal, corresponding to a PWM signal having phase A, where the lagging edge is modulated. This signal may be sent to the switch V1 and switch V4, as shown. The control circuit 82 also outputs a PWM_B signal, corresponding to a PWM signal having phase B, where the lagging edge is also modulated. This signal may be sent to the switch V2 and switch V3, as shown. As suggested in FIG. 7, the phase of the PWM_B signal and PWM_A different from one another so the switches V1 and V4 are in an OFF state when the switches V2 and V3 are in an ON state, and the switches V2 and V3 are in an OFF state when the switches V1 and V4 are in an ON state.

As further illustrated in FIG. 7 the control circuit 82 may output a PWM_C signal, corresponding to a PWM signal having phase A, where the lagging edge and leading edge are modulated. This signal may be sent to the secondary switch V5, as shown. The control circuit 82 also may output a PWM_D signal, corresponding to a PWM signal having phase B, where the leading edge and lagging edge are also modulated. This signal may be sent to the secondary switch V6 as shown. As suggested in FIG. 7, the phase of the PWM_C signal and PWM_D signal may differ from one another, in particular they complementary phases, similarly as signal PWM_A and PWM_B.

Additionally, as further discussed below the control circuit 82 may include a component(s) acting as a variable time delay generator. The control circuit 82 may also include control circuit includes logic and memory elements.

In order to adjust the level of voltage output to the weld station 30, the control circuit 82 may adjust operation of a set of primary switches, where the set of primary switches may include at least one primary switch, as exemplified by the primary switches V1, V2, V3, V4; and the control circuit may adjust operation of a set of secondary switches where the set of secondary switches may include at least one secondary switch, as exemplified by of the secondary switches V5 and V6, in accordance with a sensed current. As shown in FIG. 5, the power supply 80 may include a primary current sensor T4 arranged to measure a primary current output by the DC-AC power converter 22, and to generate a primary current sense signal. The primary current sense signal may be used to adjust the activation of primary switches V1, V2, V3, V4 by the principle of peak current mode control. The reference current Ipeak for the peak current mode control may be used to adjust the activation of secondary switch V5 and secondary switch V6. For example, since the leading edge of the PWM_C signal and PWM_D signal, sent to secondary switch V5 and V6, respectively, may be modulated by a controlled time delay, resulting in a variable time delay. The time delay may be adjusted according to the output current in the following manner. As the current increases, the reference peak current also increase, and consequently the variable time delay may increase so that the variable time delay becomes greater than one half of the switching period of the PWM_A signal and PWM_B signal at a first threshold value (see $I_{2H}$ of FIG. 1). This results in the secondary switch V5 and V6 not being activated at all. In this manner, just the voltage output by the first set of secondary windings z21 and z22 is delivered to the weld station 30, through the rectifiers V7, V8. The maximum voltage can reach the level as represented by $V_{2L}$ (FIG. 1). Below the first threshold value the variable time delay may decrease along with decreased level of output current value down to second threshold value (see $I_{2L}$ of FIG. 1). In the current regime between $I_{2H}$ and $I_{2L}$, a given reduction in current results in a given reduction of time delay where the given reduction in time delay increases activation of the secondary switch V5 and secondary switch V6. This increased activation results in a larger value of voltage drawn from the auxiliary set of secondary windings 26, thus increasing the voltage output to the weld station 30. Below a current corresponding to the second threshold value $I_{2L}$, the time delay for activating the secondary switch V5 and secondary switch V6 may become zero, so the secondary switch V5 and secondary switch V6 may be activated without delay or permanently and simultaneously conducting. In this low current regime, the operation of secondary switches (V5-V6) may be not directly dependent of the current value and the maximum voltage output may remain on the high level over a range of current down to zero current.

Notably, the application of secondary switches in the power supply 80 may result in instant or very fast change of the transformer ratio during the active phase of the power conversion. The current in the switches V1-V4 of the DC-AC power converter 22 is accordingly changing rapidly. When a peak current mode control is applied, for PWM and for the control of the transformer core saturation, this rapid change of current may interrupt the control principle, reducing operation stability of the DC-AC power converter 22.

To address this issue, in the power supply 80 of FIG. 7, the primary current sense signal may be attenuated dynamically during the ON phase of the secondary switches V5 and V6. In the particular embodiment, the current sense is attenuated proportionally to the ratio between the main secondary winding and the main plus auxiliary secondary windings. The current sense signal may be disturbed, while after filtering may be still available for control of the operation of the power supply 80.

To address this issue, in other embodiments, the transformer stage 42 may be substituted for two transformers such as in the power supply 40. In this manner the presence of a separate auxiliary transformer with two secondary windings allows a primary current sensor to deliver current without rapid change. A drawback of this latter configuration is that when the auxiliary converter transformer T2 is not being used, a magnetization current still circulates, resulting in additional losses and there is no secure protection against the saturation of the transformer T2.

In various embodiments, the lagging edge of PWM signals controlling secondary switches may be modulated in the same way as for switches of a main converter, by the same control principle. Notably, just using modulation of the leading edge of PWM signals in the secondary switches may often be more effective. In this case the secondary switch may be switched off at some interval after the beginning of the opposite phase; thus the switching off process may be carried out with no current (zero current switching ZCS)

Figure 8:
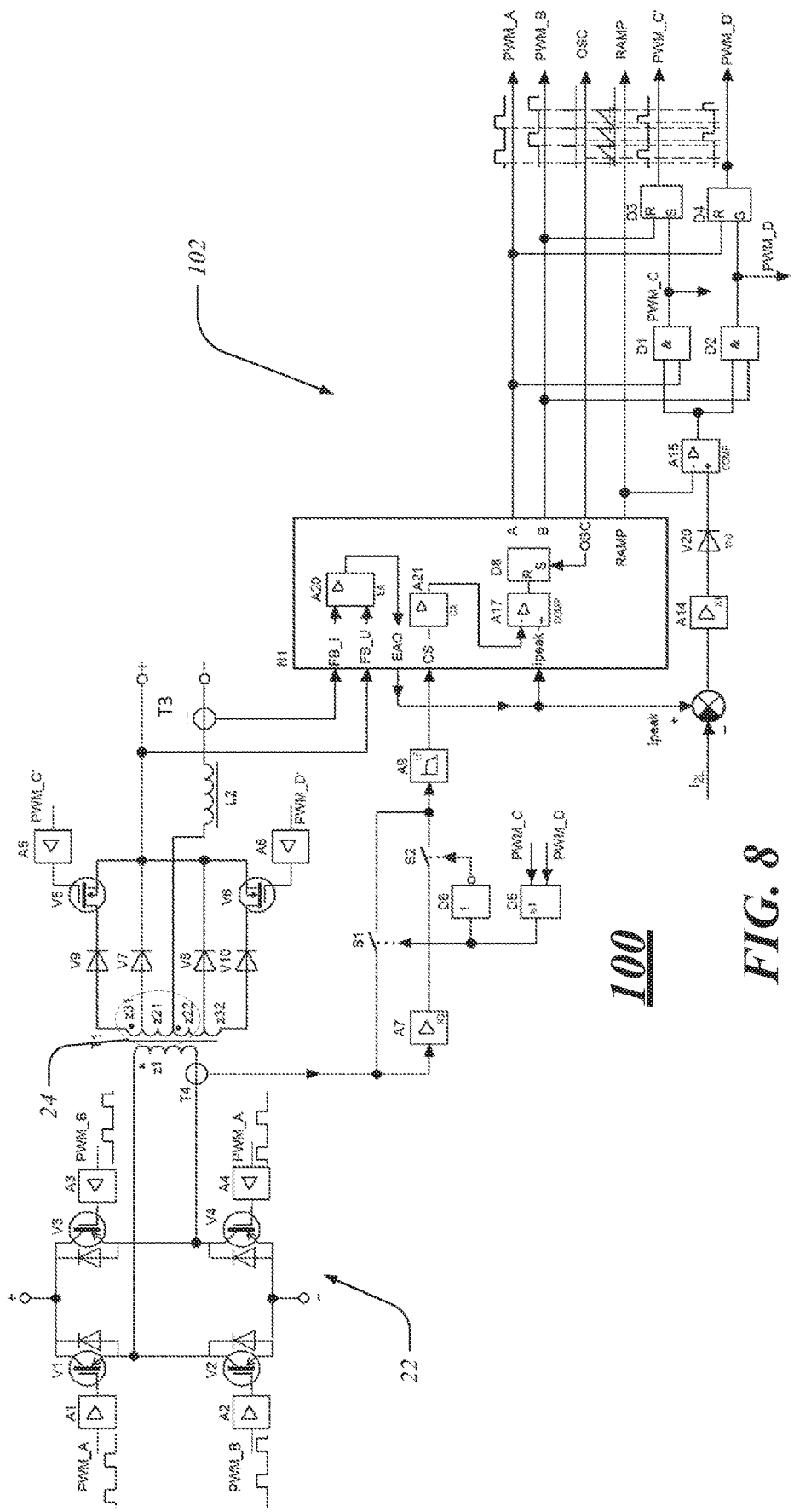

FIG. 8 shows a circuit diagram of a power supply 100 according to further embodiments of the disclosure. The power supply 100 may be arranged similarly to power supply 80, save for some differences including the differences discussed below. In particular, the power supply 100 includes a control circuit 102 having a set of RS flip-flops, shown as RS triggers D3, D4. The triggers are arranged to provide exclusively leading edge modulation for control of secondary switch V5 and secondary switch V6, to provide zero current switching off. As shown in FIG. 8, for example, the output from D3 is a PWM_C' signal, representing a leading edge modulated PWM signal of phase A, where this signal is received by the secondary switch V5. Similarly, the output from D4 is a PWM_D' signal, representing a leading edge modulated PWM signal of phase B, where this signal is received by the secondary switch V6. In order to secure zero current switching of the V5 and V6 secondary switches, the lagging edges of the PWM_C' and PWM_D signals may be further extended. The lagging edge may be further delayed over the beginning of the PWM signals of a phase A and a phase B. In different embodiments, those delays may be fixed or may be current-dependent delay. In a further variant the zero current switching control may employ current sensing or voltage sensing and additional control logic.

Figure 9:
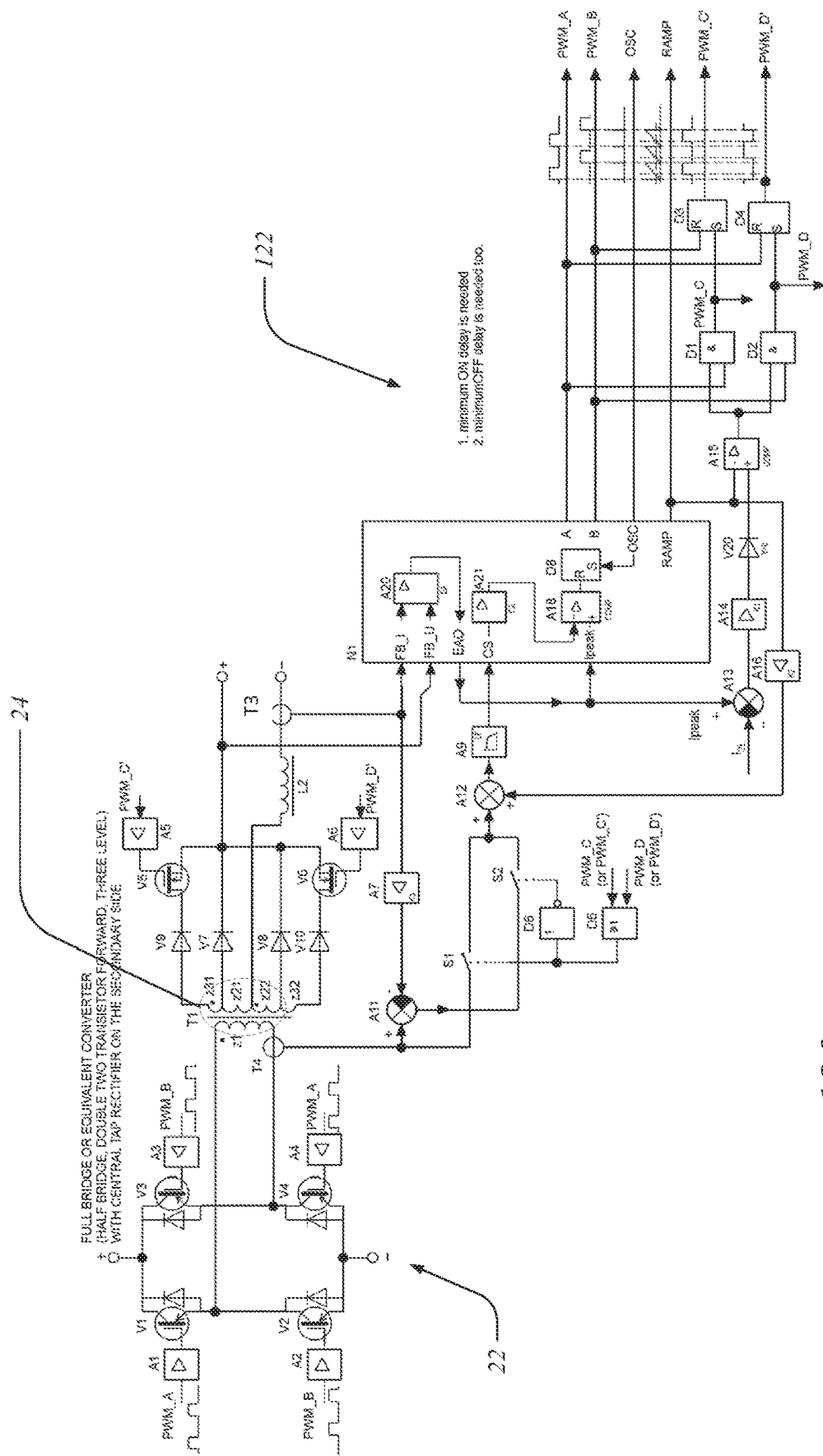

FIG. 9 shows a circuit diagram of a power supply 120 according to further embodiments of the disclosure. The power supply 120 may be arranged similarly to power supply 80 or power supply 100, save for some differences including the differences discussed below. In addition to the control circuit 122, a distinguishing feature of the power supply 120 is the circuitry that provides for a primary current sense signal to be combined with a secondary current sense signal during the ON phase of the secondary switches, that is, the secondary switch V5 and secondary switch V6. As illustrated, a summing node A11 is arranged to receive a primary current sense signal from primary current sensor T4 and is also arranged to receive a secondary current sense signal from secondary current sensor T3. The summing node A11 may add these signals together during the ON phase of secondary switch V5 or secondary switch V6. The current sense signal may be disturbed, while after filtering may be used for control of the operation of the power supply 120.

Figure 10:
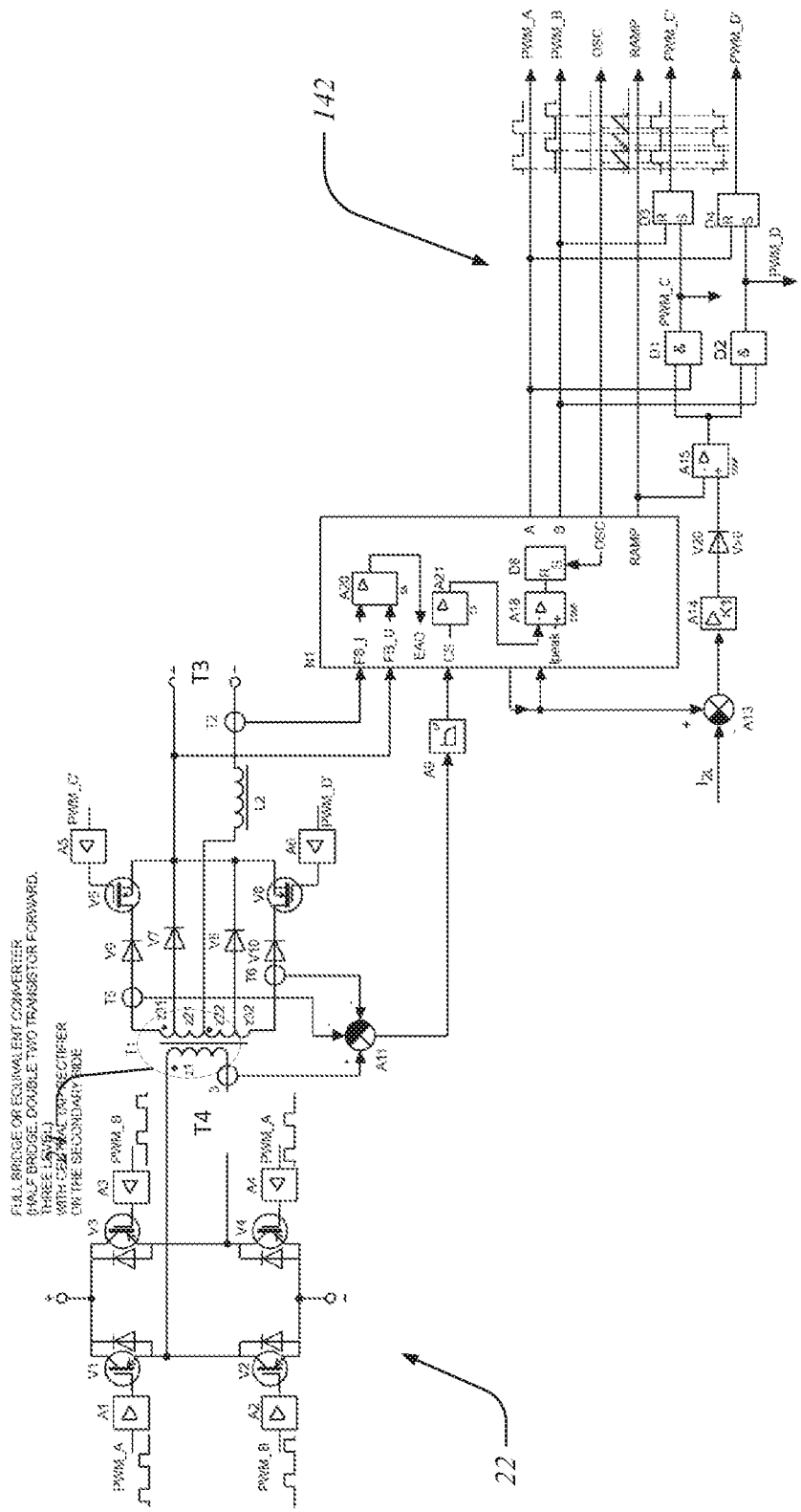

FIG. 10 shows a circuit diagram of a power supply 140 according to further embodiments of the disclosure. The power supply 140 may be arranged similarly to power supply 80 or power supply 100, or power supply 120, save for some differences including the differences discussed below. In particular, the power supply 140 includes a control circuit 142 and a pair of secondary auxiliary current sensors, shown as sensor T5 and sensor T6. The sensor T5 is arranged to sense current between the auxiliary windings of the secondary side of transformer stage 24 and the secondary power switch V5. The sensor T6 is arranged to sense current between the auxiliary windings of the secondary side of transformer stage 24 and the secondary power switch V6. The sensor T6 and sensor T5, as well the primary current sense signal and the current sense signals from sensor T6 and sensor T5 may be combined. This provides a straightforward manner to control voltage output by the transformer stage 24 in a feedback loop by measuring g primary current as well as the auxiliary secondary current.

Figure 11:
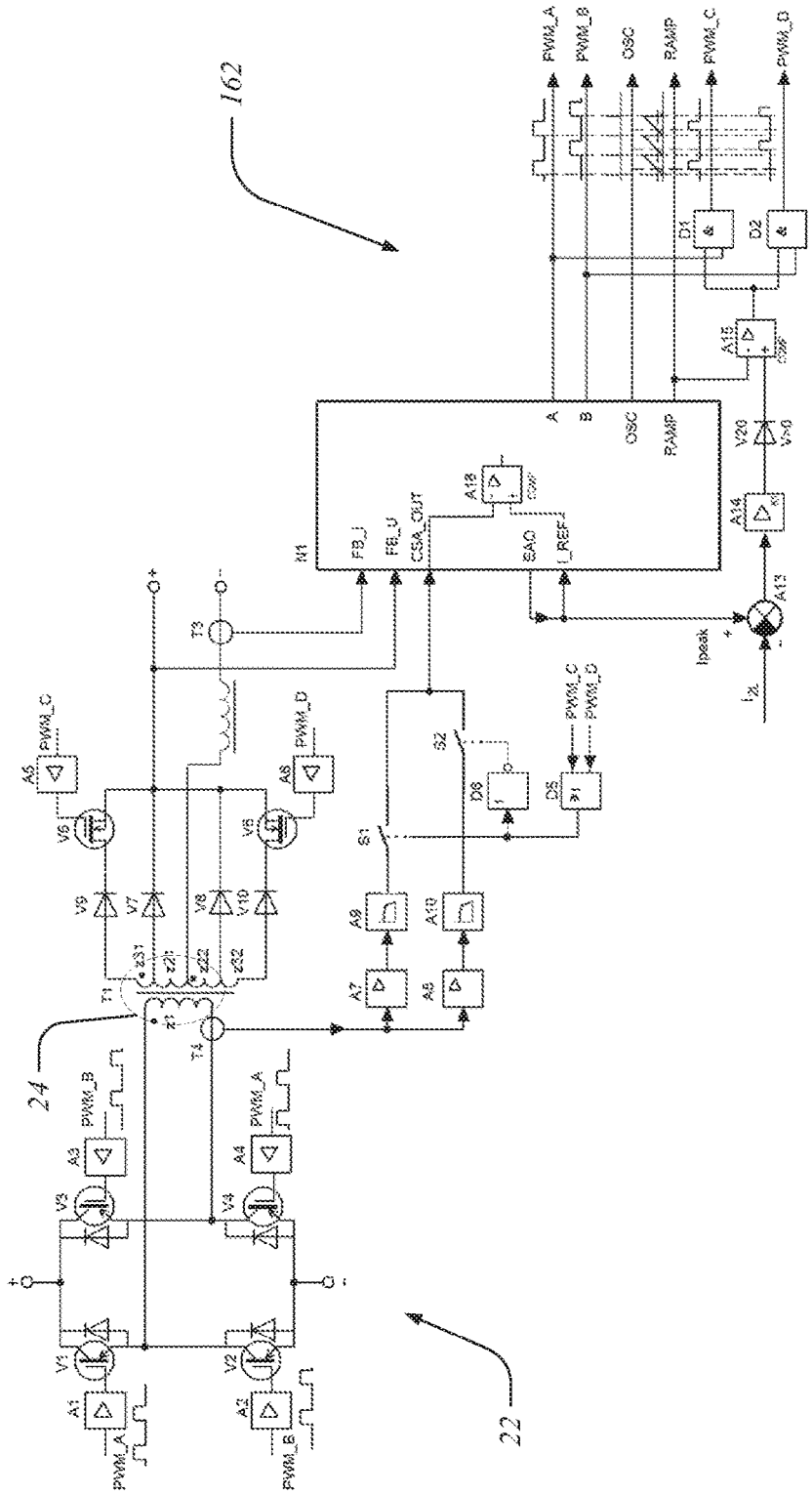

FIG. 11 shows a circuit diagram of a power supply 160 according to further embodiments of the disclosure. The power supply 160 may be arranged similarly to power supply 80 or power supply 100, or power supply 120, or power supply 140, save for some differences including the differences discussed below. In particular, in the control circuit 162, signal switching may be applied after filtering. For example, the control circuit 162 may include a filter component, shown as a current sense low pass filter A9, and a current sense low pass filter A10 between the voltage controlled switch S1 and voltage controlled switch S2, respectively and primary current sensor T4.

Figure 12:
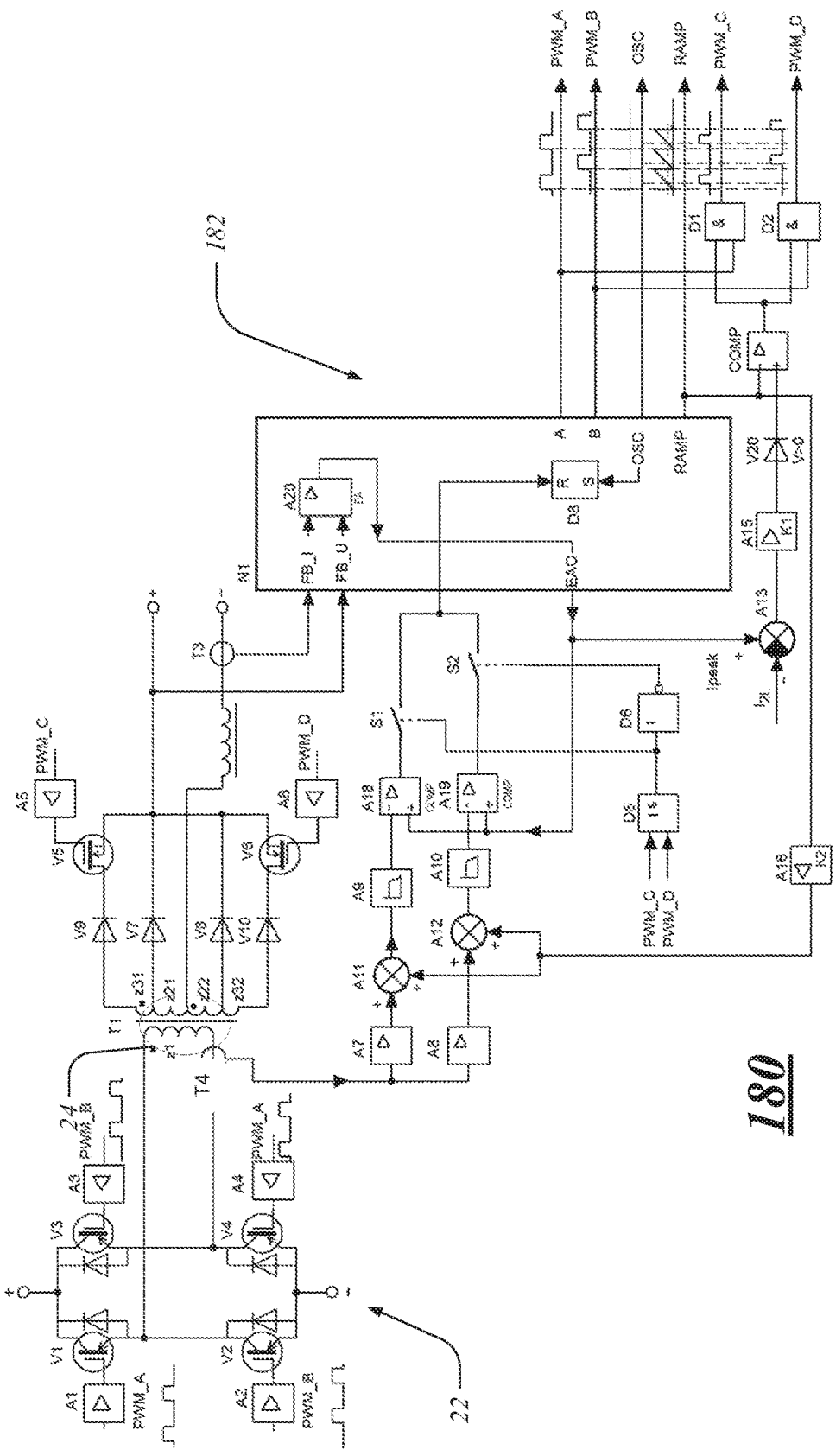

FIG. 12 shows a circuit diagram of a power supply 180 according to further embodiments of the disclosure. The power supply 180 may be arranged similarly to power supply 80 or power supply 100, or power supply 120, or power supply 140, or power supply 160 save for some differences including the differences discussed below. In particular, in the control circuit 182, two PWM comparators are provided, shown as the lagging edge modulation comparator A18 and lagging edge modulation comparator A19.

In all aforementioned embodiments, to create the variable time delay of the leading edge PWM modulation for the operation of the secondary switches, a threshold current value, the threshold current reference proportional to the current level $I_{2L}$ (FIG. 1), is subtracted from the peak current reference Ipeak in the summing node A13, and after amplification or attenuation, given to the comparator A15 to create adequate delayed signal by means of the comparison with certain ramp signal.

Figure 13:
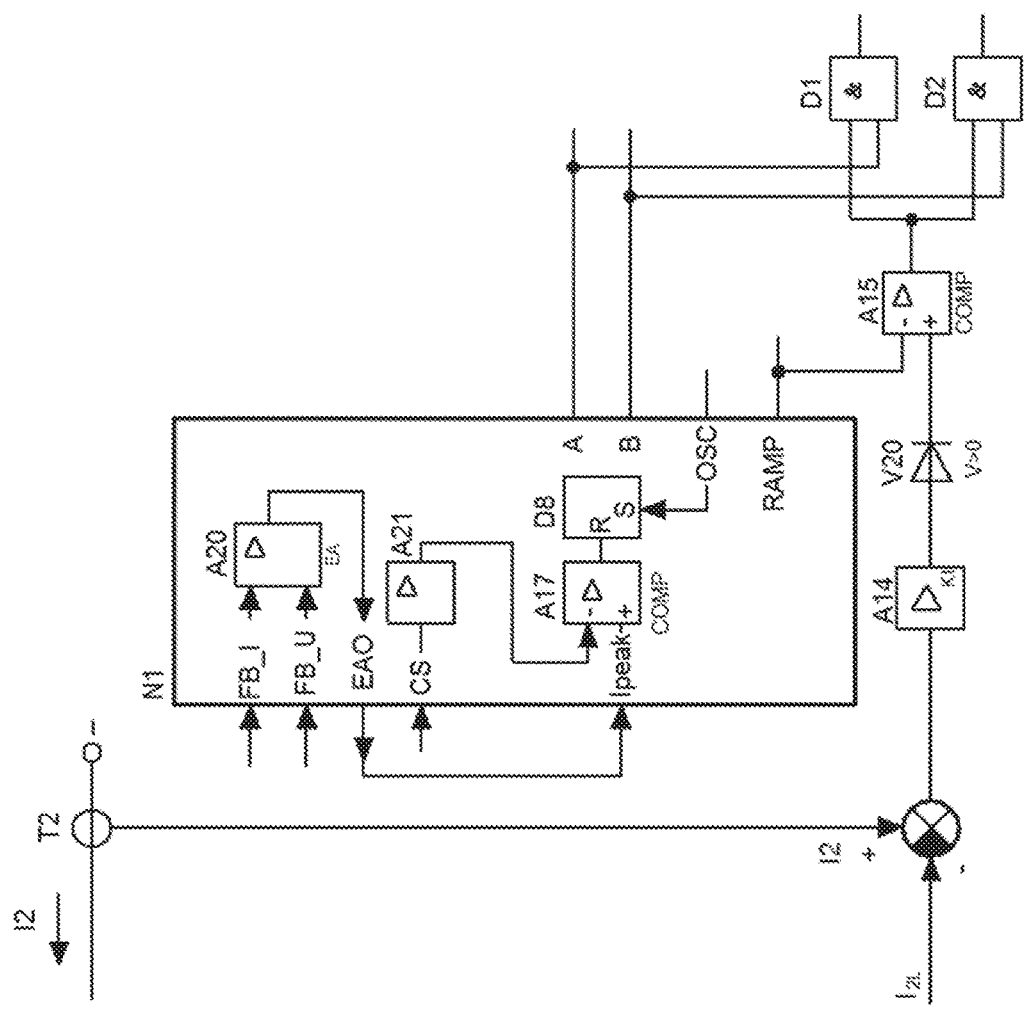

FIG. 13 shows an alternative embodiment of performing current sense that may be applied in conjunction with the circuitry and techniques of the aforementioned embodiments. The threshold current reference proportional to the current level $I_{2L}$ (FIG. 1) is subtracted from the secondary current sense value Its proportional to the secondary current I2 in the summing node A13, then after amplification or attenuation, given to the comparator A15 to create adequate delayed signal by means of the comparison with certain ramp signal.

Figure 14:
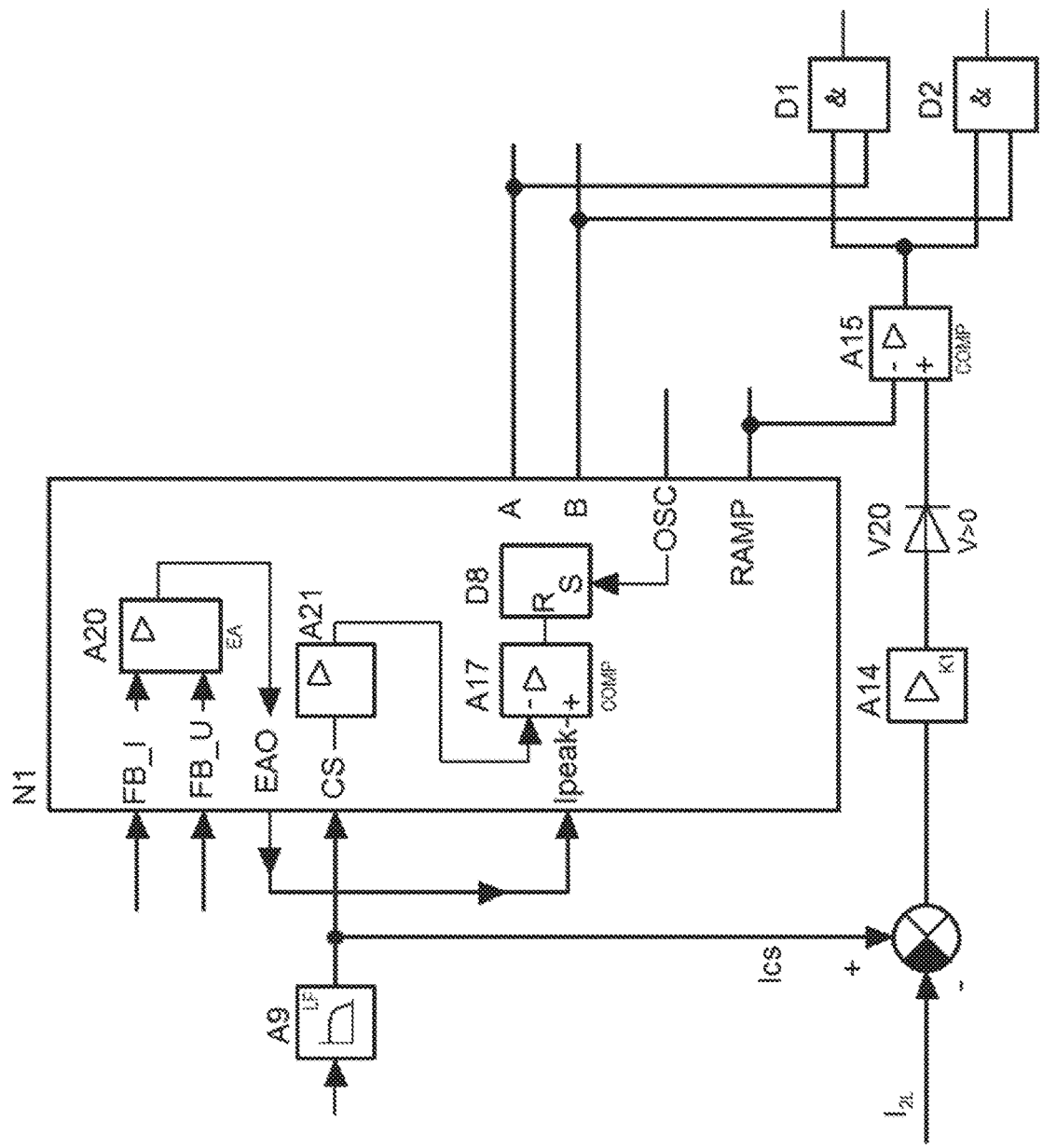

FIG. 14 shows a further embodiment of performing current sense that may be applied in conjunction with the circuitry and techniques of the aforementioned embodiments. In this embodiment, the threshold current proportional to the current level $I_{2L}$ (FIG. 1) is subtracted from the primary current sense value Ics used as an input for peak current mode control, in the summing node A13, then after amplification or attenuation, given to the comparator A15 to create adequate delayed signal by means of the comparison with certain ramp signal.

In various additional embodiments, signal switching may be applied at any point along the entire circuit of the lagging edge creation, either on analog or discrete signals.

Figure 15:
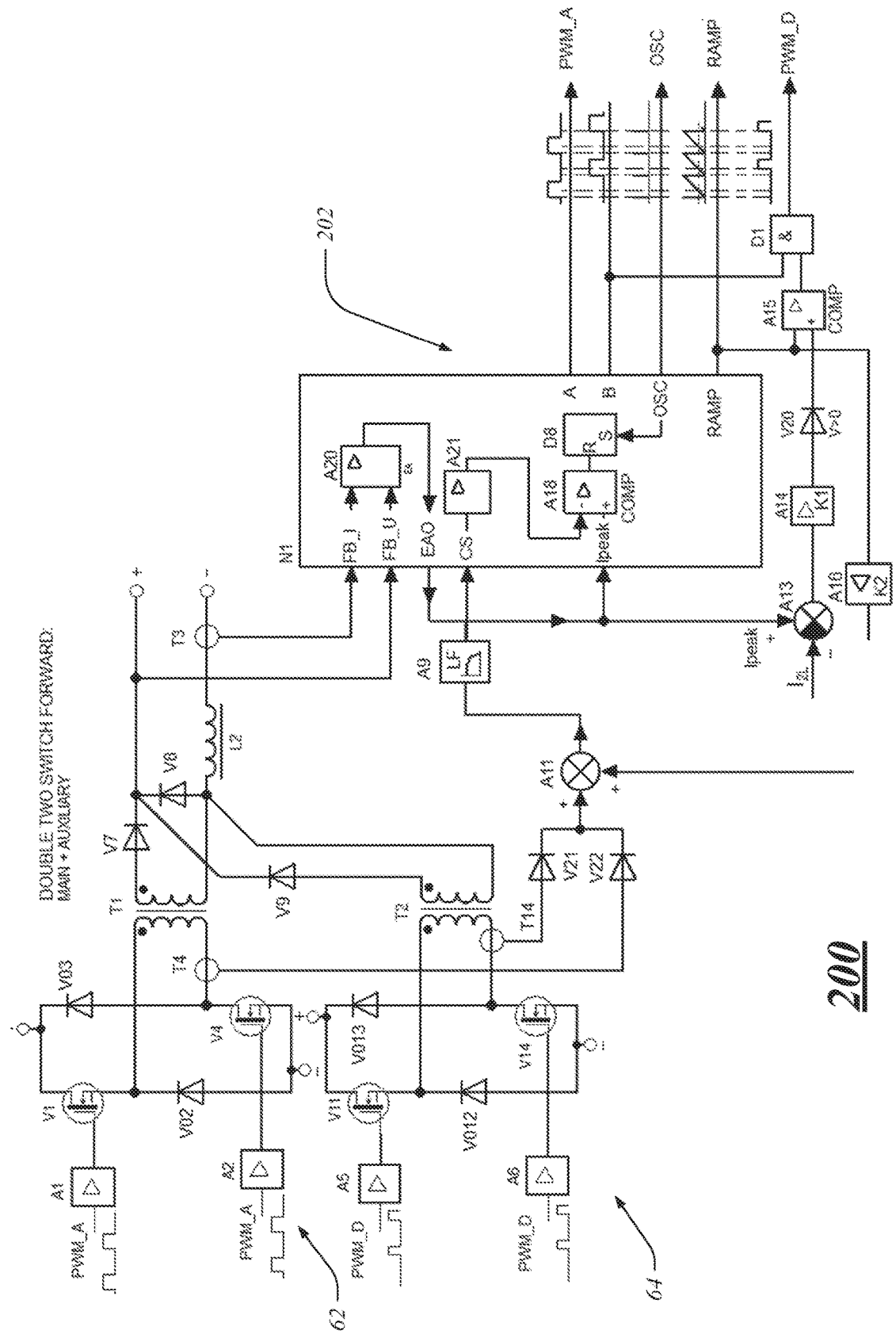

FIG. 15 shows a circuit diagram of a power supply 200 according to further embodiments of the disclosure. The power supply 200 may be arranged similarly to power supply 60 with the addition of the control circuit 202

One novel aspect of the power supply 200 is the way of controlling of a second two-switch forward converter or any type converter operating with limited duty cycle using the modulation of the two pulse edges: lagging edge and leading edge. In particular, in addition to a primary current sensor T4 arranged to measure a primary current output by the main power converter 62, the power supply 200 includes a primary current sensor T14 coupled to measure the current output of the auxiliary DC-DC power converter 64. In keeping with the operation principles discussed previously, the additional converter, the auxiliary power DC-AC converter 64, may not operate at all when the output current from the main power converter 62 is larger than the threshold value $I_{2L}$. An advantage of the present embodiment is the essentially lower power of the auxiliary DC-AC power converter 64. Another advantage is that the auxiliary DC-AC power converter 64 may be enclosed as a separate module, giving a manufacturer the flexibility to produce power supplies with or without the extended voltage characteristic feature.

Figure 16:
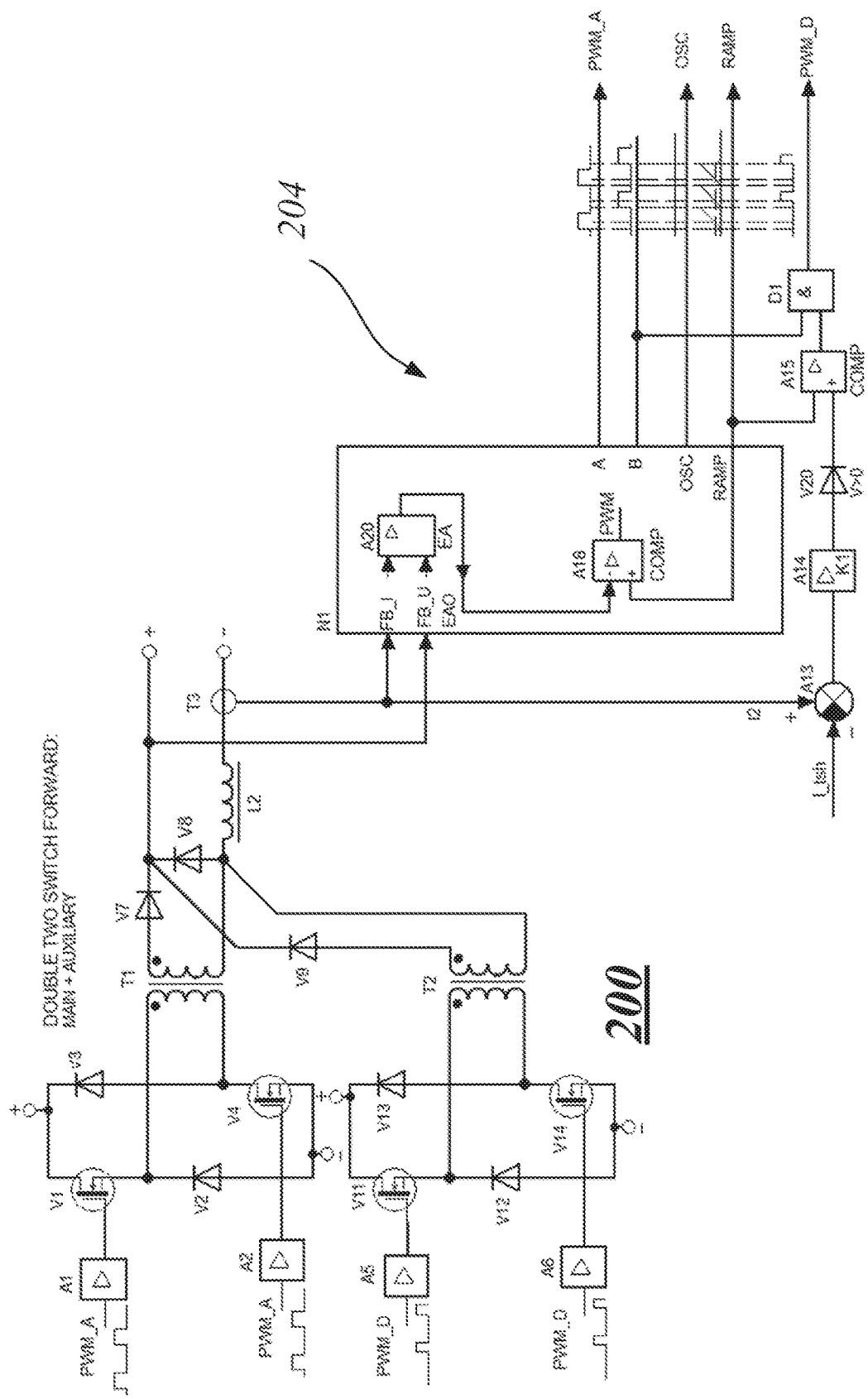

FIG. 16 shows another embodiment where a power supply 200 includes two two-switch forward converters. According to its operating principle, this type of the power converter does not need primary current sense. In such an application the internally generated ramp of the control system 204 is used for leading and lagging edge pulse width modulation.

Figure 17:
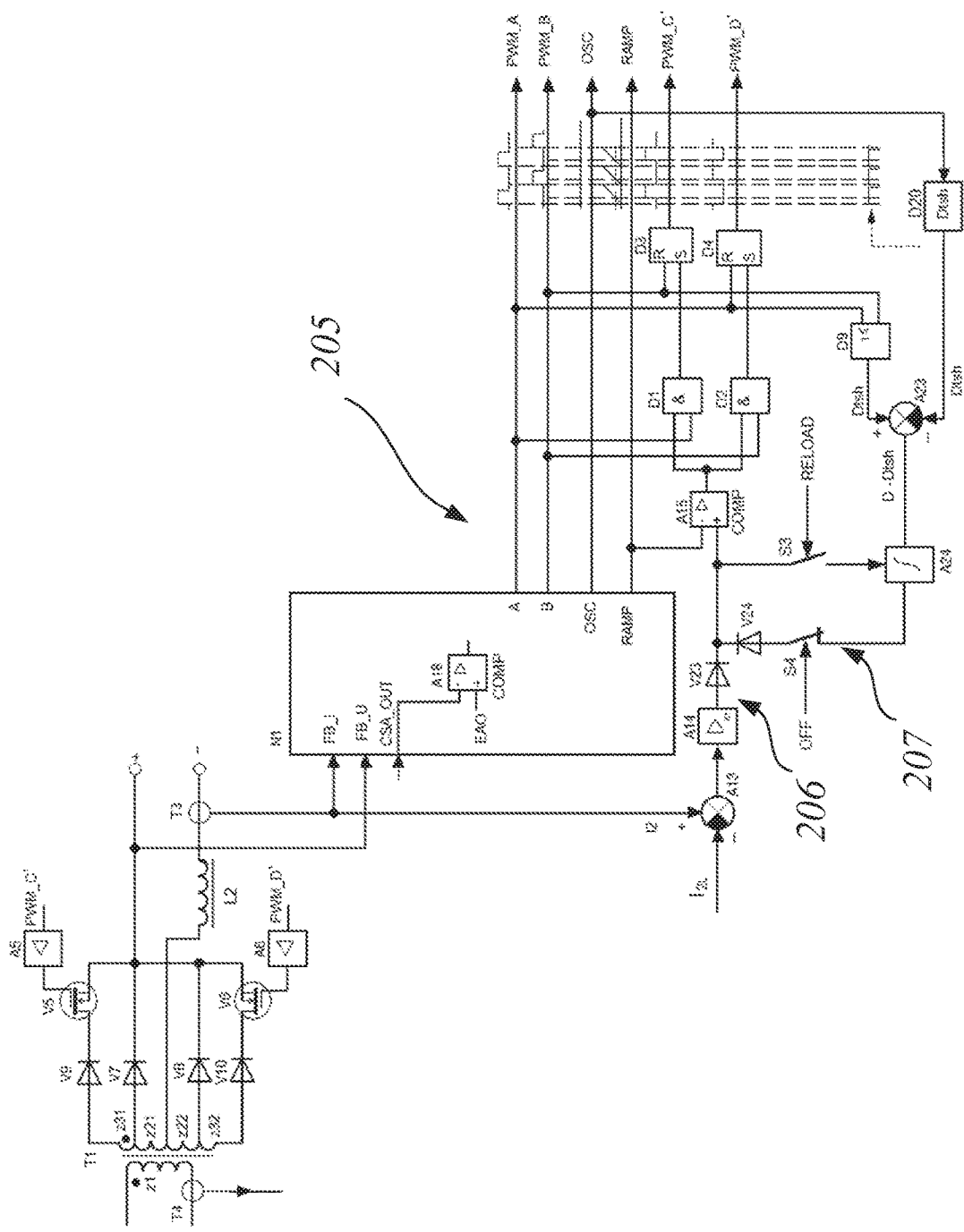

FIG. 17 shows an extension of the control of the leading edge modulation in aforementioned systems, according to a further embodiment. The control system 205 comprises two sources of the signal in the leading edge modulation, including a proportional signal 206 and integral signal 207, which are connected to the input of the comparator A15 in a concurrent way. This is schematically depicted by the implementation of two ideal rectifiers V23 and V24. In various embodiments, this function may be performed according to different solutions effectively performing the same function. In particular, the function may be performed using a number comparison in computer code. The proportional signal 206 is the same as in previous embodiments with the same principle of the operation. Schematically this operation is depicted by the summing node A13 and amplifier/attenuator A14. The integral signal 207 may be created in the additional feedback loop. The actual duty cycle D is compared with a certain threshold value Dtsh in the summing node A23. The difference between those two values may drive the integrator or other astatic regulator A24, and the output of the integrator A24 is the additional source of the signal controlling the leading edge. The integrator A24 may be periodically reloaded with the last value of the delay taken after rectifiers V23 and V24 in purpose to increase the speed of the operation. The operation principle is schematically depicted by implementation of the switch S3. The integrator can be temporarily switched off during the transitions to increase the speed of reaction of the control system. The operation principle is schematically depicted by implementation of the switch S4. For the same purpose a regulator may be cyclically present on different conditional instances.

Figure 18:
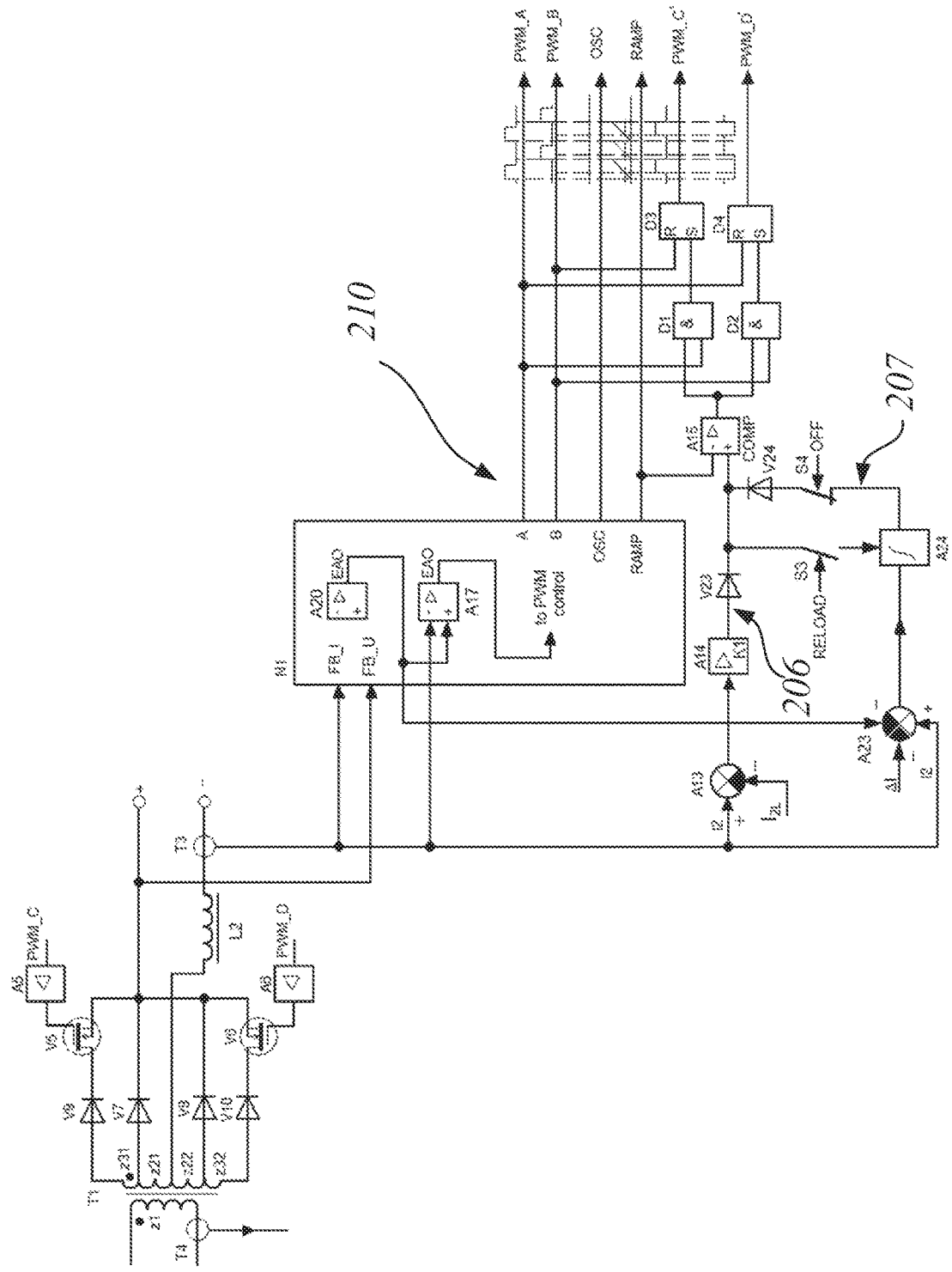

FIG. 18 shows another control circuit 210 for control of the leading edge modulation in aforementioned systems according to an additional embodiment. There are two sources of the signal for the leading edge modulation, a proportional signal 206 and integral signal 207, connected to the input of the comparator A15 in a concurrent manner. The proportional signal 206 is the same as in previous embodiments with the same principle of the operation. The integral signal 207 is created in the additional feedback loop. The summing node A23 have negative input from the average current reference Jay, positive input from the secondary current I2 and the positive input of the certain current offset ΔI. The output of the summing node feeds integrator or other astatic regulator A24, which delivers integral signal 207. To increase the speed of operation, the regulator A24 may be cyclically reloaded with the actual value, as is depicted by operation of the switch S4 and temporarily disabled, as is depicted by operation of the switch S3. For the same purpose regulator may be cyclically present on different conditional instances.

In some embodiments, a variable time delay may be increased by an alternative signal dependent on a value of a load connected to the welding apparatus. In further embodiments, the alternative signal comprises a signal received from a regulator comprising an integrator or other regulator, the regulator being fed by a difference between values of actual duty cycles of the first and second PWM signal and a reference duty cycle value. In additional embodiments, the alternative signal comprises a signal received from a regulator comprising an integrator or other regulator, the regulator being fed by a difference between an actual secondary current and a reference secondary current. In other embodiments the alternative signal may be temporarily switched off or preset to improve a dynamic response of the apparatus. In further embodiments, the alternative signal may be temporarily switched off or preset to improve a dynamic response of the apparatus. In other embodiments, the alternative signal may be cyclically updated with an actual value of the delay to improve a dynamic response of the apparatus.

In various additional embodiments the output voltage may be regulated using the principle of lagging edge PWM applied to a full bridge (FB) converter. In various embodiments, a DC-DC converter is provided, including a transformer having a central tap (CTAP), base windings and extending windings connected in series to the base windings, in a manner where the central tap is also a central tap towards the extending windings. The present embodiments may include methods of control applicable to various sets and connections of secondary windings.

In various additional embodiments, a power supply is provided, including a DC-DC converter equipped with an active rectifier circuit connected to secondary windings of an isolation transformer, where the active rectifier circuit includes a passive rectifier connected to base windings and active rectifier connected to auxiliary windings. The present embodiments may include methods of control applicable to various types of passive and active rectifiers (central tap of different connection, bridge, current doubler) appropriate for a particular set and connections of secondary windings.

In various additional embodiments, an active rectifier circuit provides regulation of the output voltage using the principle of leading edge PWM. An embodiment of a first control system applies PWM peak current mode control (PCM). Another embodiment may apply voltage control PWM (VM). Both PWM peak current mode and PWM voltage control mode may provide a modulation of the lagging edge, thus providing a direct regulation of the average output voltage. A peak current control loop may carry out pulse-by-pulse comparison of a current signal with the signal from an error amplifier (EA), thus producing a pulse width modulated signal. Due to innate big signal instability, a given ascendant ramp signal may be added to the current signal to ensure the stability of the control for duty cycles greater than 0.5. The voltage control mode embodiment may be considered as an extension of PCM mode, as a system in which the peak current signal is removed and the PWM signal is produced by comparison of the EA output signal with the ramp signal. Thus, no further description of VM control mode is provided herein. One reason for applying PCM to the FB converter is the protection against transformer core saturation. Another reason is for fast current control.

In particular embodiments, the output signal from the EA controls the leading edge PWM that drives switches of the output active rectifier. The EA output signal controls in a manner where, when the duty cycle driven by the output EA signal of the first lagging edge PWM (lagging edge PWM duty cycle) reaches a predefined maximum, the leading edge of a second control system starts to shift from a maximum duty cycle towards the beginning of the cycle. This manner of control provides a seamless output voltage regulation. This embodiment enables unified PWM control by means the same (common) EA output signal, in a manner where a first duty cycle of the lagging edge increases to a maximum, while just when the lagging edge reaches the maximum, the leading edge moves backwards, continuing the output voltage increase.

To apply this method in various embodiments, a current signal summed with an ascendant ramp signal is added to the descendant ramp signal of a given amplitude. The descendant ramp signal reaches zero at the maximum duty cycle. While the output EA signal commands the maximum duty cycle of the first PWM control and increases, the second PWM control seamlessly starts to move the leading edge towards the beginning of the cycle.

In various embodiments concurrent VM PWM control is applied to the second PWM control. Starting from a given current $I_{2L}$ the leading edge is shifted toward the end of the duty cycle proportionally to the current increase. At a certain current Im the leading edge is shifted to the point of the predefined maximum duty cycle, disabling completely the operation of the switches in the active rectifier. In this way, in various embodiments the output voltage range is limited to a predefined range, and simultaneously, an extended voltage is provided by an active rectifier just when needed.

In various embodiments ZCS operation is brought about by the delay in the switching off of switches in an active rectifier (active rectifier switches), and the providing of voltage of an opposite phase at least for a certain duration. A ZCS operation of the active rectifier is useful due to high currents and the presence of stray and leakage inductances. Non-ZCS operation may cause damage of the active rectifier. For this purpose, a pulse of a minimum duration may be generated when the active output rectifier goes towards passive operation, i.e., switches are not activated. In this instance, a first PWM control forces a minimum pulse width in any instance when the active switch was activated during the previous switching cycle. For the same purpose, the command for switching a power supply off is not generated instantly. First, synchronously, an active rectifier is disabled for launch on the next cycle. Then, after the finishing of the last ZCS transition, the power supply is synchronously turned off.

Figure 19:
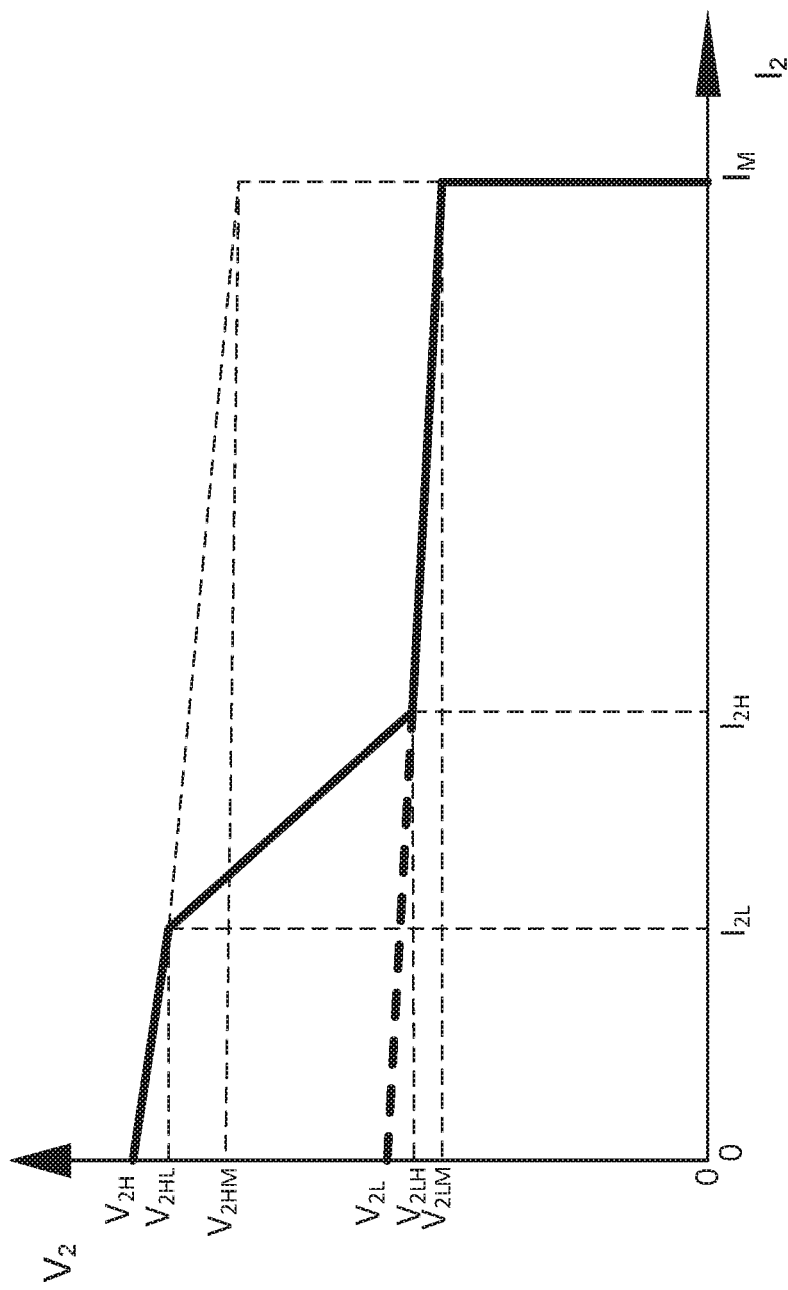
FIG. 19 depicts a voltage-current range limits of a power supply.

FIG. 19 depicts a required voltage-current range, similar to FIG. 1, while accounting for the non-ideality of power converters. A dashed line from the point $(0,V_{2L})$ to the point $(I_{2H}, V_{2LH})$, together with a continuous line to the point $(I_M, V_{2LM})$ depict the maximum voltage delivered by a power supply with a disabled active output rectifier. A line exhibits a small droop, corresponding to the non-ideality of a transformer of the power supply. Similarly, a continuous line from $(0,V_{2H})$ to $(I_{2L}, V_{2LH})$ together with a dashed line towards a point $(I_M, V_{2HM})$ depicts the maximum voltage available at full operation of the active rectifier. A line from point $(I_{2L}, V_{2HL})$, drooping to a point $(I_{2H}, V_{2LH})$, depicts the voltage limitation provided by the concurrent PWM control of the second, leading edge PWM control. The overall maximum voltage range lies below the continuous line. According to present setting and momentary impedance of the output, the operating point, i.e, momentary output current and momentary output voltage, may lie anywhere inside this range. At the same time, according to the present embodiments, unified PWM control employs an active rectifier just when the operating point lies over the dashed line from $(0, V_{2L})$ to $(I_{2H}, V_{2LH})$.

Figures 20A, 20B:
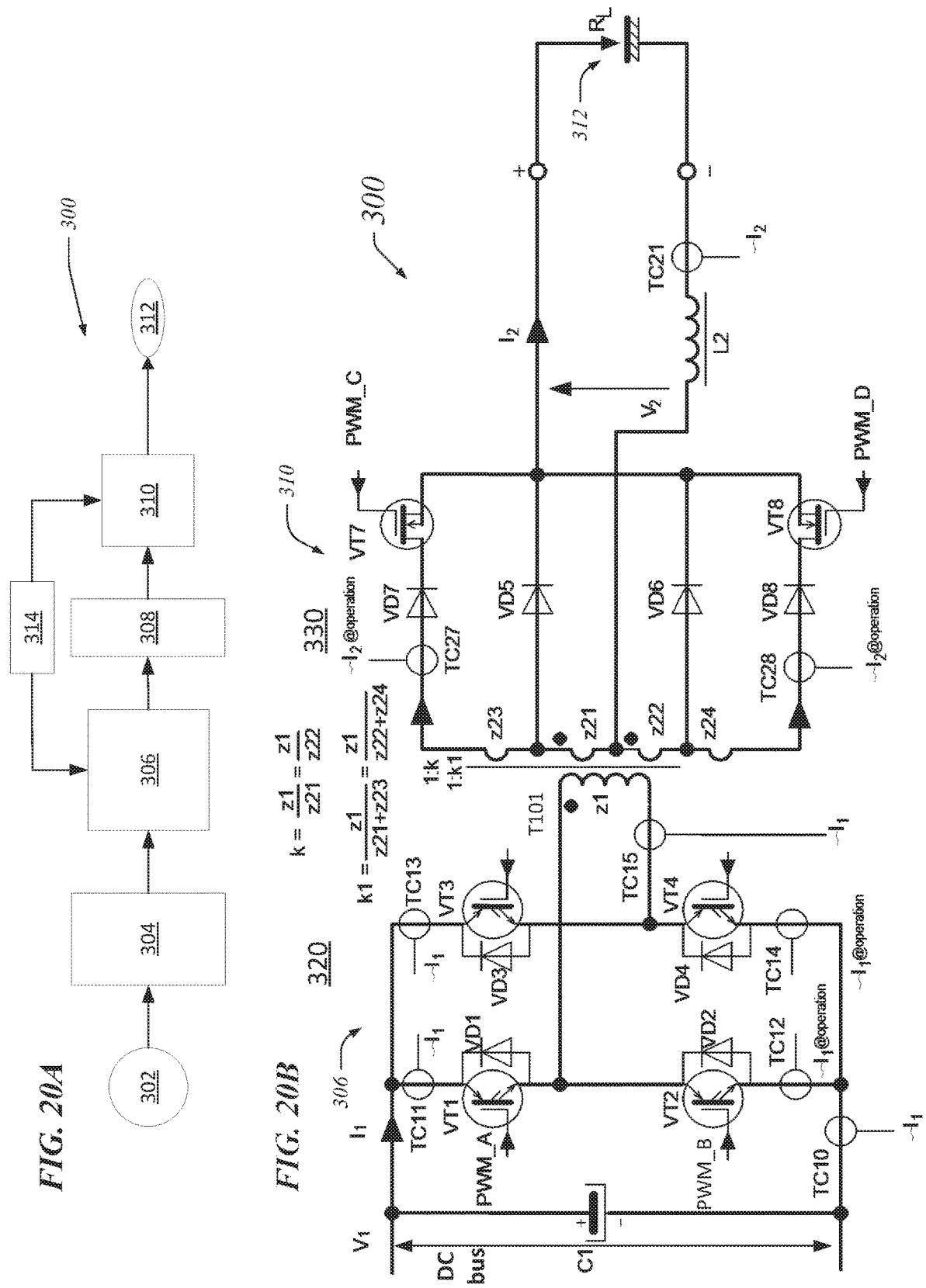
FIG. 20A shows a block diagram and FIG. 20B depicts a circuit diagram of an exemplary apparatus according to embodiments of the disclosure.

FIG. 20A shows a block diagram and FIG. 20B shows a circuit diagram of a power supply 300 according to further embodiments of the disclosure. The power supply 300 may be coupled to receive power from an AC source 302, and may include an input rectifier circuit 304 to receive AC voltage and output a DC voltage as a DC bus (or "DC bus voltage"), or may include an alternate-direct current converter (AC-DC) disposed to output a DC bus in other embodiments.

The power supply 300 may also include a full bridge (FB) converter 306 to receive a DC bus and output a primary AC voltage. The primary AC voltage may be received by an isolation transformer stage 308, which stage outputs secondary power to an active rectifier circuit 310. The active rectifier circuit 310 may output power for welding at a load 312. The power supply 300 may further include a controller 314 whose operation is detailed below.

Turning now to FIG. 20B a capacitor C1 is shown to depict limited capacity of the bipolar conductivity of the direct current bus (DC bus) that provides primary voltage $V_1$. The full bridge converter 306 of power supply 300 includes four switches, symbolically depicted as insulated gated bipolar transistors (IGBT)—shown as VT1, VT2, VT3, VT4. In other embodiments, any suitable switches may be applied in place of the IGBTs. A given switch has an anti-parallel diode, shown as VD1, VD2, VD3, VD4. The full bridge converter 306 is coupled to the isolation transformer stage 308, shown in FIG. 20B as a transformer T101 having primary winding z1. The transformer T101 serves to isolate the primary side 320 from the secondary side 330 of the power supply. The secondary windings of transformer T101 have four sections connected is series in order: z24, z22, z21, z23. A central tap is connected to the output inductor L2, providing a negative pole of the power supply. Since the output circuit may include inductance, the inductor L2 may be located on the positive pole, the output voltage V2 is considered as the voltage taken before the inductor.

Passive rectifiers VD5, VD6 are connected to z21 and z22 windings, providing lower level of output voltage within all current ranges. The transformer ratio for the voltage delivered to the passive rectifiers may be presented as a fraction of turns k=z1/z21=z1/z22. An active rectifier is formed from two switches VT7 and VT8 and respective diodes VD7, VD8, connected in series. The active rectifier circuit 310 is connected to the z23 and z24 windings, providing an elevated output voltage. Switches VT7, VT8 are presented symbolically as metal oxide field effect transistors (MOSFET), while in other embodiments any type of suitable switch may be applied for purposes of switching. The serially connected rectifier VD7 and the switch VT7 (as well as the serially connected rectifier VD8 and the switch VT8) may be treated as a controlled rectifier analogue to a silicon controlled rectifier (SCR, thyristor)—a switch of unipolar conductivity.

The transformer ratio for the voltage delivered to the active rectifiers may be presented as the fraction of turns k1=z1/(z21+z23)=z1/(z22+z24). The load is symbolically presented as a welding process receiver RL (understood as a resistor). In various embodiments the polarity of rectifiers and switches may be altered, while not altering the principle of operation.

As further shown in FIG. 20B, various current sensors may be arranged in different chains of the circuit. In particular, there are shown a group of primary sensors, shown as sensors TC10, TC11, TC12, TC13, TC14, TC15, located at different positions on the primary side 320 of the power supply 300. In various additional embodiments just one or two of the sensors may be included to provide a signal proportional to the primary current of the transformer. A useful function for a primary sensor is that the primary current sense delivers current proportional to the secondary current in the presence of the transformer magnetizing current. There are three secondary current sensors shown in power supply 300, sensors TC21, TC27, TC28. In various other embodiments current sensors TC27 and TC28 may be omitted. A useful function of secondary current sensors is to provide current sense for the feedback control, including the PCM PWM control.

FIGS. 21A-21C shows a timing diagram of the output voltage in an embodiment employing switches on the secondary side 330. FIG. 21(a) shows the output voltage at current lying over the high threshold value $I_{2H}$. Just the low voltage level $V_{2L}$ appears. The PWM modulation is created on the principle of lagging edge modulation. FIG. 21B shows the output voltage for current values between the high $I_{2H}$ and low $I_{2L}$ thresholds. A high $V_{2H}$ voltage level and low $V_{2L}$ voltage level are present. The leading and the lagging edges of the high voltage portion are modulated. FIG. 21C shows the output voltage at current values below the low threshold value $I_{2L}$. Just the high voltage level $V_{2H}$ appears. The PWM modulation is created according to the principle of lagging edge modulation.

Figure 22:
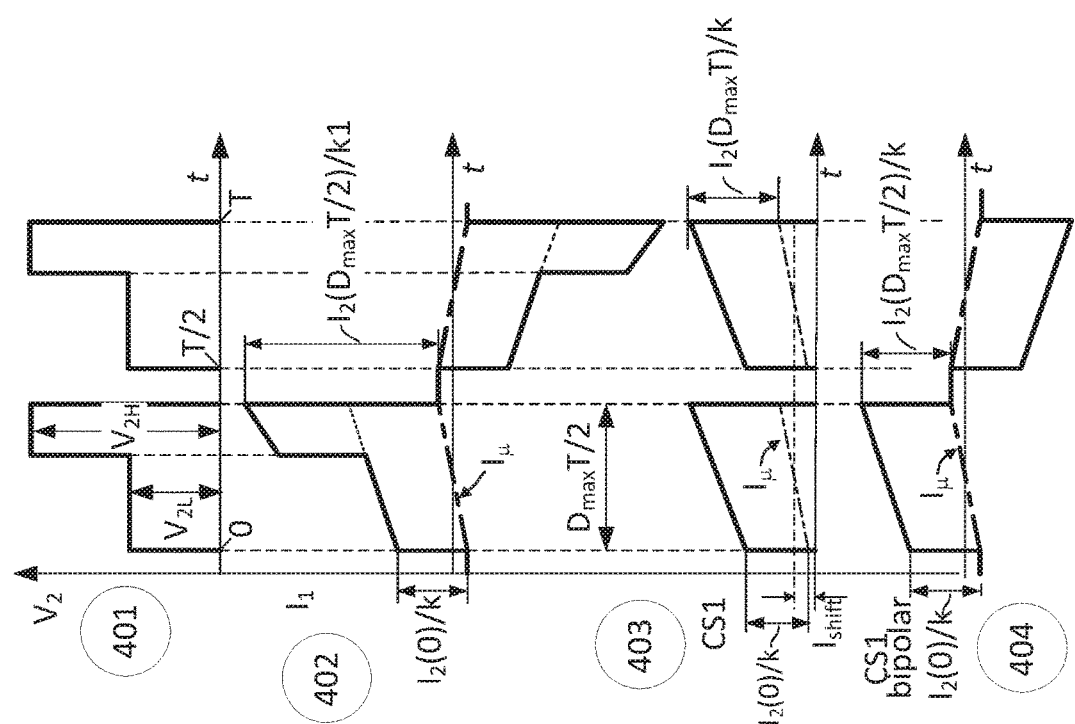
FIG. 22 depicts timing diagrams of current sense modification according to embodiments of the disclosure.

FIG. 22 shows a time diagram of the primary current sense and primary modified current sense. Timeline 401 shows the output voltage in a case when the active rectifier delivers certain voltage different. The lag of the high voltage is more than zero, while less than $D_{max}T/2$. The primary current $I_1$ has a shape shown on the timeline 402. Upon the rapid change of the current signal within the cycle, a PWM comparator would trip, disabling the delivery of the elevated voltage. To enable the operation and preserve information regarding magnetizing current the secondary current signal is subtracted or added, depending on the phase of the operation, from the primary current signal during the operation of the active rectifier with adequate coefficient, defined by the difference of transformer ratios (k–k1). A resulting current sense signal is proportional to the secondary current divided by the transformer ratio k plus magnetizing current. The shape of the current sense created in this manner is presented in the timeline 404 and is bipolar in character. This current sense may be used in embodiments with doubled PWM comparators, separate for each phase of operation. To operate with a unipolar signal and single PWM comparators before rectification of the signal, a certain $I_{shift}$ level is added or subtracted to preserve a positive derivative of the magnetizing current during the active phase, as shown in the timeline 403.

Figure 23A:
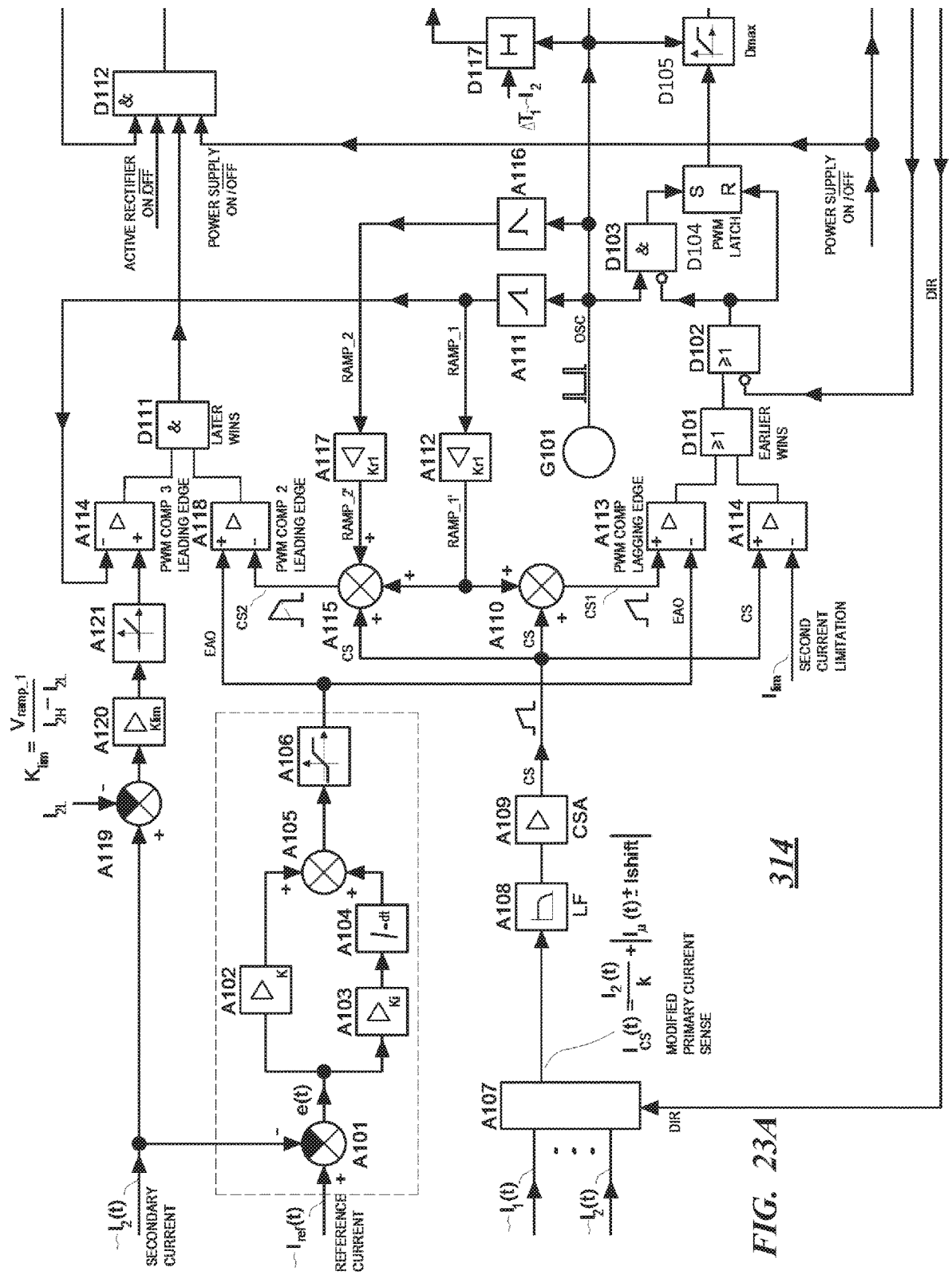
FIG. 23A and FIG. 23B depict a circuit diagram of a PWM controller according to embodiments of the disclosure.
Figure 23B:
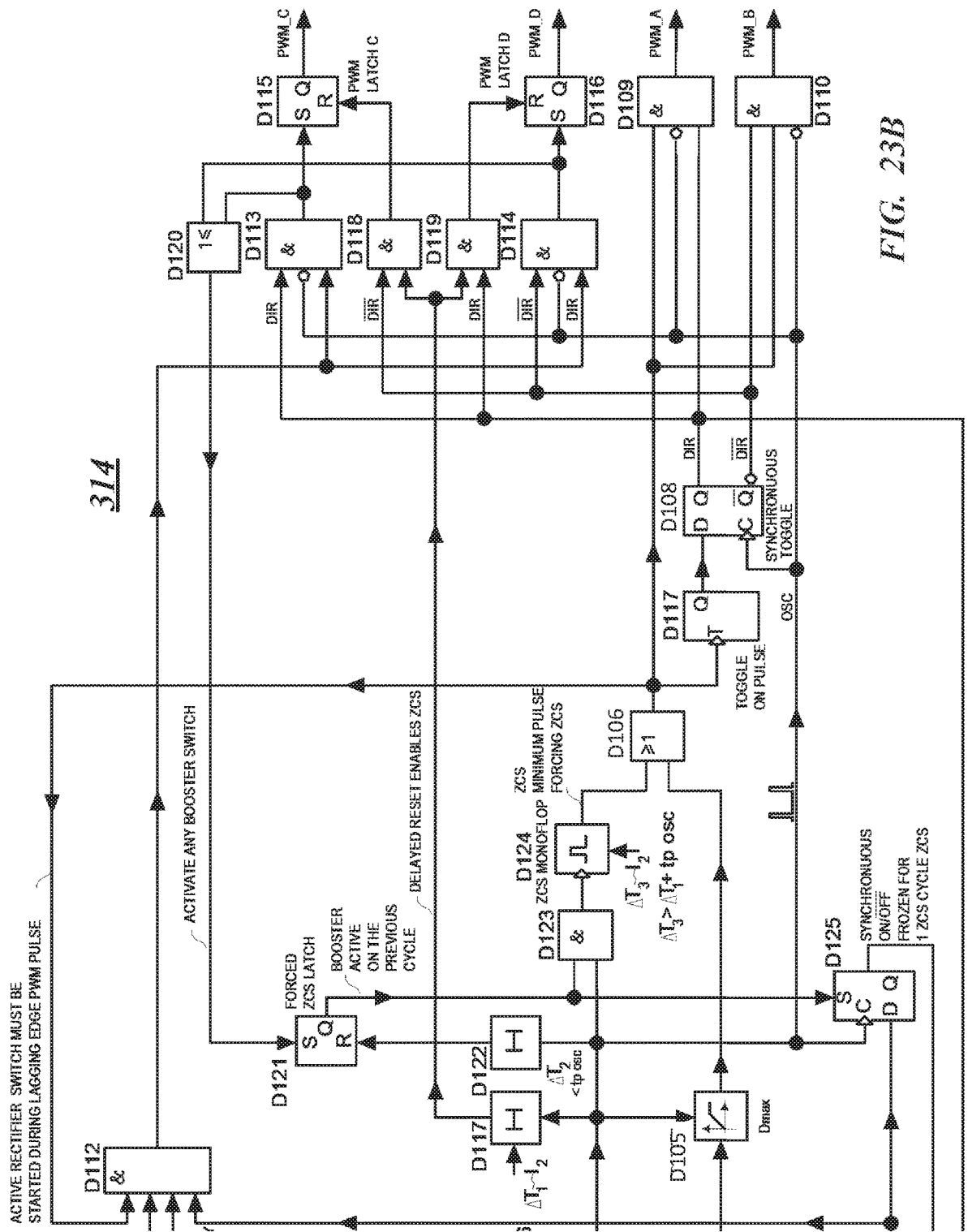
Figure 23:
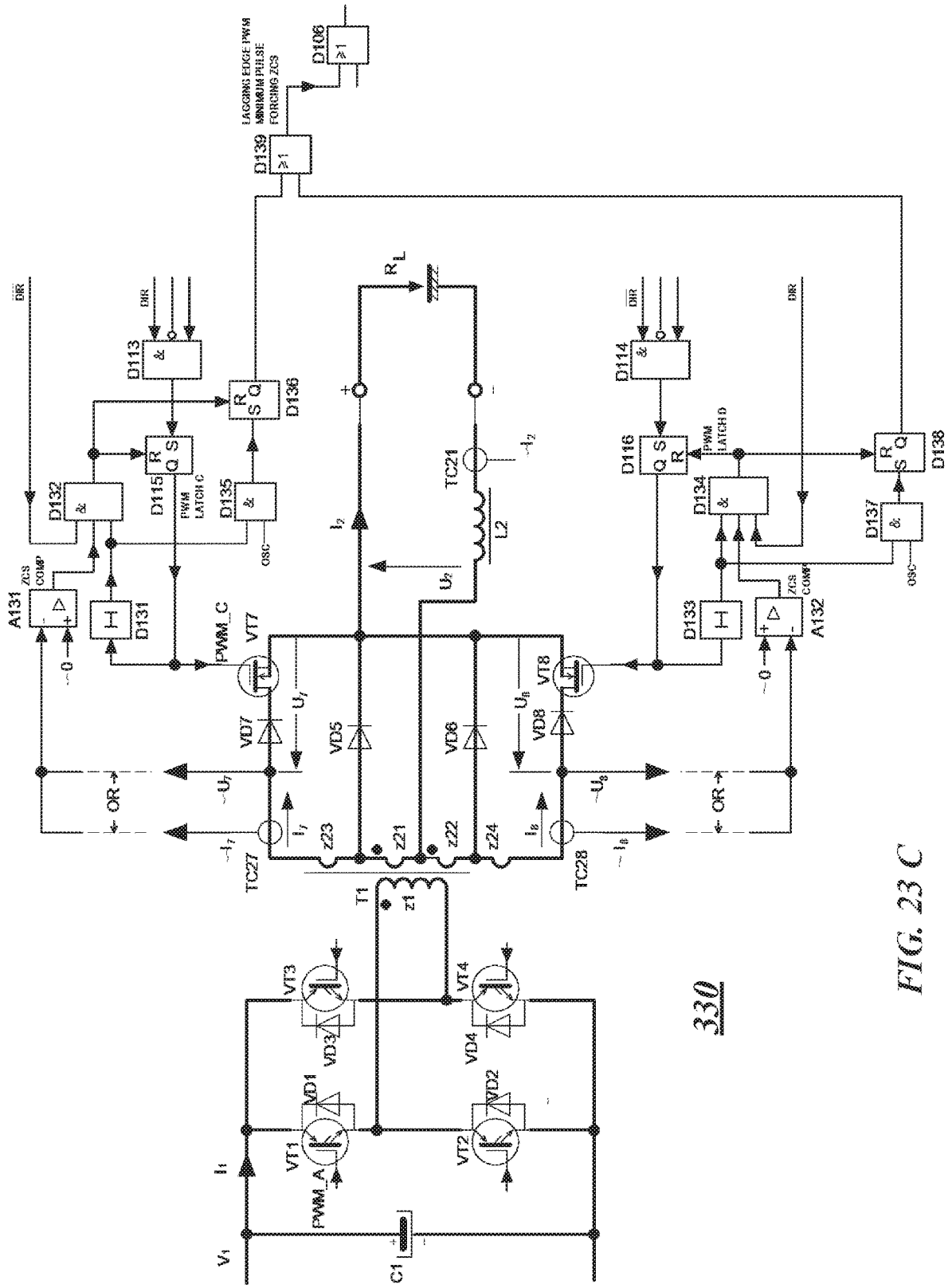
FIG. 23C illustrates a power circuit and control circuit according to an alternative embodiment of the disclosure.

FIG. 23A and FIG. 23B present a diagram of an embodiment of a unified controller for a power supply having extended voltage range. The controller 314 may be distinguished as a part of an average current control with a minor PCM control loop. The controller 314 may be embodied as a combination of hardware and software, as may be appreciated by those of skill in the art. As detailed below the controller 314 may include a first pulse width modulation (PWM) system, wherein a position of a lagging edge of a control pulse is modulated; and a second PWM system, wherein a position of a leading edge of a control pulse is modulated. In particular embodiments the controller 314 is arranged to apply a lagging edge pulse width modulation (PWM) using a lagging edge PWM control system for control of a primary converter, and to apply a leading edge PWM using a leading edge PWM control system for control of an active rectifier circuit. In various embodiments, the lagging edge PWM control system and the leading edge PWM control system of controller 314 control an output of a welding power supply by controlling an output current (such as output DC current), an output voltage or a function of the output current and output voltage. Advantageously, the controller 314 may also operate wherein the lagging edge PWM control system and the leading edge PWM control system are driven by a common feedback signal. By providing unified control using a common feedback (driving) signal, the feedback loop gain may change less rapidly and may be easy to adjust. The average output voltage increase may also follow seamlessly the change of a command signal. In addition, an active rectifier may not begin operation until needed, in other words, may not operate until a first PWM control reaches a maximum.

As shown in FIG. 23A, a signal, proportional to a secondary current I2 is subtracted from the reference signal in the error amplifier (EA) that contains: summing node A101, proportional amplifier A102, amplifier A103, integrator A104, summing node A105 and limiter A106. The error amplifier output signal (EAO) is delivered to the lagging edge PWM comparator A113 input. A modified primary current signal having a trapezoidal form, devoid of influence of the switching operation of the active secondary rectifier, is delivered to another input of the lagging edge PWM comparator A113, previously modified by the addition of the ascending ramp signal. The ramp signal is produced in the ramp generator A111, synchronized by pulses form the pace oscillator G1. The ramp signal needs to have a certain amplitude; therefore, a proportional amplifier/attenuator A112 is included before the ramp signal comes to the summing node A110 as a signal RAMP_1'. Considering gates D101, D102, D103 to be transparent, it may be concluded that lagging edge PWM comparator A113 output resets the PWM latch D104. PWM latch D104 is set at the beginning of the period by the oscillator signal (OSC) from the oscillator G1. The maximum duty cycle in the system is limited by the limiter D105, and then the leading edge PWM signal is output on one of the gates D109 or D110, depending on the state of the direction trigger D118. For this consideration, the gate D106 is assumed to be transparent.

The methods of creation of the modified current signal are depicted in FIG. 22 and various embodiments of current sense modifiers are described in the embodiments with respect to the previously discussed figures. In the current embodiment, a modified, unipolar current sense signal that contains a fraction proportional to the secondary current and a fraction proportional to absolute value of the preliminary shifted magnetizing current is produced by the modifier A7. The sign of the shift is changed due to direction of magnetization, as is depicted by implementation of the signal DIR from the direction trigger D118. A low low-pass filter A108 and current sense amplifier A109 are also shown in current sense circuit.

In the present embodiment, the modified current sense signal is unipolar. In various other embodiments the current sense may be bipolar. In those embodiments, all PWM comparators with current sense inputs (A113, A114, A118) are doubled, and their outputs are coupled using respectively OR or AND logic gates. In general, for various embodiments, a method involves the provision to the PWM comparators of a current sense signal that is proportional to a sum of the secondary current divided by the transformer ratio taken for basic secondary windings, and the primary sensed magnetizing current of the transformer, wherein the slope of both fractions has the same derivative (increasing or decreasing). Various methods based on various sources of current sense signals can be applied.

The present embodiment employs another concurrent comparator A114, for limitation of the maximum current. Output signals of comparators are summed in the OR gate D101. Various embodiments of utilization of this comparator are possible in purpose of protection against the transformer's core saturation and/or excessive current protection. In general, in various embodiments the number of alternative concurrent compactors connected on logic OR may vary from zero to few, depending on requirements. In particular, the comparator with input from the magnetic flux sensor of the transformer T101 may be applied, for PCM as well as VM control modes, and especially for VM lagging edge PWM.

In the present embodiment the PWM latch D104 may not be set at the beginning of the cycle, if the EAO signal is driven low. In this manner, the particular PWM pulse may be omitted. This method relies on the principle of pulse skipping. Since certain PWM pulses may be skipped, the direction of magnetization is not to be changed. Therefore, in the present embodiment, the trigger D117 toggles just on the PWM pulse, not on the OSC pulse. The state of the toggle trigger D117 is re-written to the direction trigger D118 synchronously on OSC pulse.

In present the embodiment, the previously described current sense signal CS is summed in the summing node A115 with descending ramp signal RAMP_2' and ascending ramp signal RAMP_1'. The descending ramp is generated in ramp generator A116, then amplified/attenuated to the needed level by means of the amplifier/attenuator A112. The ramp signal produced by the generator A116 at the beginning of the cycle starts from the maximum value, then reaches zero at the time of the predefined maximum duty cycle, the one predefined in limiter D105. The output signal CS2 from the summing node A115 in the present method has a descending slope during all cycles within all existing and predicted ascending slopes of the CS current signal and the RAMP_1' slope.

In accordance with the present embodiment, the method of creation of the leading edge PWM is disclosed. The CS2 signal begins to exceed the EAO signal before the time defined by the maximum duty cycle, just when the maximum duty cycle in the first, lagging edge PWM is reached. The further increase of the EAO signal crosses the descending slope of the CS2 signal, and trips the leading edge PWM comparator A118. Considering gates D111, D112, D113, D114 to be transparent, the leading edge PWM signal from the leading edge PWM comparator A118 sets one of the D115, D116 triggers, which trigger produces output leading edge PWM signals, driving the switches of the active rectifier. The CS2 signal has a descending slope; thus with increasing EAO signal, the moment of tripping the leading edge PWM comparator A118 is moving the beginning of the cycle. As a result, an increasing EAO signal causes first an increase of duty cycle of the FB converter, then after reaching the maximum, causes an increase of duty cycle of the active rectifier.

To limit the output voltage regardless of the command from the error amplifier, another leading edge modulation is implemented in the depicted embodiment. A signal proportional to the output current is given to the summing node A119, where a certain value adequate to a required first point of the voltage limitation, defined as current $I_{2L}$, is subtracted from the signal. Then, the signal is amplified/attenuated in the amplifier/attenuator A120 and rectified in the rectifier A121, i.e., negative values are zeroed.

The gain of the A120 is defined by the amplitude of the ramp RAMP_1 and a required second point of the voltage limitation, defined as a current $I_{2H}$. Both leading edge comparators are connected by the AND logic principle in the gate D111, allowing latter signal to form the rising edge of the leading edge PWM. As a result, the output voltage range is limited to the region of lower current according to FIG. 19.

Since in the described method, depending on the manner of current sense modification in A107, the CS signal may disappear on the lagging edge PWM, and is required to form the leading edge just within an active lagging edge range, the lagging edge signal from the duty cycle limiter D115 blanks the leading edge PWM signal in the AND gate D112. Furthermore, the leading edge signal may also be removed by a power supply off signal or by the active rectifier off signal as shown in FIG. 23A. Leading edge PWM tripping signal from the output of the gate D112 is directed through the gates D113 or D114 to set input of a one of two PWM latches D115 or D116, respectively, to the active phase defined by the DIR signal from the direction trigger D108. To secure ZCS PWM latches D115 and D116 are reset after a certain time in relation to the beginning of the cycle. In the present embodiment, a delay element D117 is applied. The time of the delay may be proportional to the output current as presented in the figure. Alternatively, the time of the delay may be set constant, according to a maximum required delay. In alternative embodiments, the delay may be replaced by logic, driven by the current or voltage sensors located in the branches of active rectifier, as described above with respect to the previous figures.

Every time the lagging edge PWM pulse is generated, the lagging edge PWM pulse is memorized (stored) by the ZCS latch D121 on signal from OR gate D120, which sums set signals of the leading edge PWM latches (see FIG. 23B). Then, at the beginning of a cycle, a pulse is generated by the ZCS monoflop D124. This pulse is for generating minimum lagging edge PWM pulse of the opposite phase needed for ensuring ZCS operation. The ZCS latch D121 is reset after generation of the minimum pulse, which is secured by the implementation of the delay D122. Due to the process of unifying lagging edge and lead edge PWMs, the minimum pulse may virtually not appear. Notably, if the EAO signal decreases instantly, a generation of the minimum pulse will protect the devices from non-ZCS switching.

For purposes of securing ZCS operation, a D125 trigger may also be implemented as shown. On the event of the power supply switching off, firstly the generation of the active rectifier drive signal is blocked. The D121 trigger maintains the D125 trigger in an ON state. Not until after the generation of the last lagging edge pulse of minimum width, at the beginning of the next cycle, does the OFF signal stop further setting of the PWM latch D104.

Notably, in other embodiments, a voltage control mode may also be applied in PWM control. In these other embodiments, the previous considerations remain unchanged, with the removal of the primary current sense and adjustment of both ramps by adjustment of gains of amplifiers A112, A117. Respectively CS1 signal begins at zero at the beginning of the cycle.

An alternative embodiment, where voltage or current sense is applied for securing ZCS operation, is presented in FIG. 23C. The circuit arrangement 330 may employ sensing of the currents $I_7$, $I_8$ in the branches of the active rectifier using current sensors T27, T28, or may employ sensing of the voltage on the active unipolar switches VD7 together with VT7, and VD8 together with VT8. In various embodiments, voltage on the active part of the switch, i.e. on VT7 or VT8, may be sensed. The leading edge PWM latches D115 and D116 are set by PWM signals selected by gates D113 and D114, respectively, in the same way as in the previous embodiment. The leading edge latches D115, D116, are reset not by the delayed signal of a new cycle, rather by signals from comparators A131, A132, which comparators sense the presence of current in the active switches or a voltage drop on the active switches. Once current reaches zero, or voltage drop reaches zero, respective leading edge PWM latch D115 or PWM latch D116 is reset, and respective switch, VT7 or VT8, is switched off in absence of the current. The delays D131, D133 and AND gates D132, D134 are applied to secure a proper operation of the circuit. The independent minimum pulse of the lagging edge PWM, needed for ZCS operation, while generated in the previous embodiment using monoflop D124, in the present embodiment is generated based upon on logical conditions. The minimum pulse is commenced by the pace signal OSC by setting the latch D136 or latch D138. The AND gates D135, D137 allow the setting of triggers just in the presence of the leading edge PWM signal. Latch D136 and latch D138 are reset simultaneously with lagging edge latches D115, D116. The lagging edge PWM signal that forces the operation of the primary converter independently of the feedback signal is created upon the output of the OR gate D139 and is delivered to the lagging edge control system through the gate D106.

Figure 24:
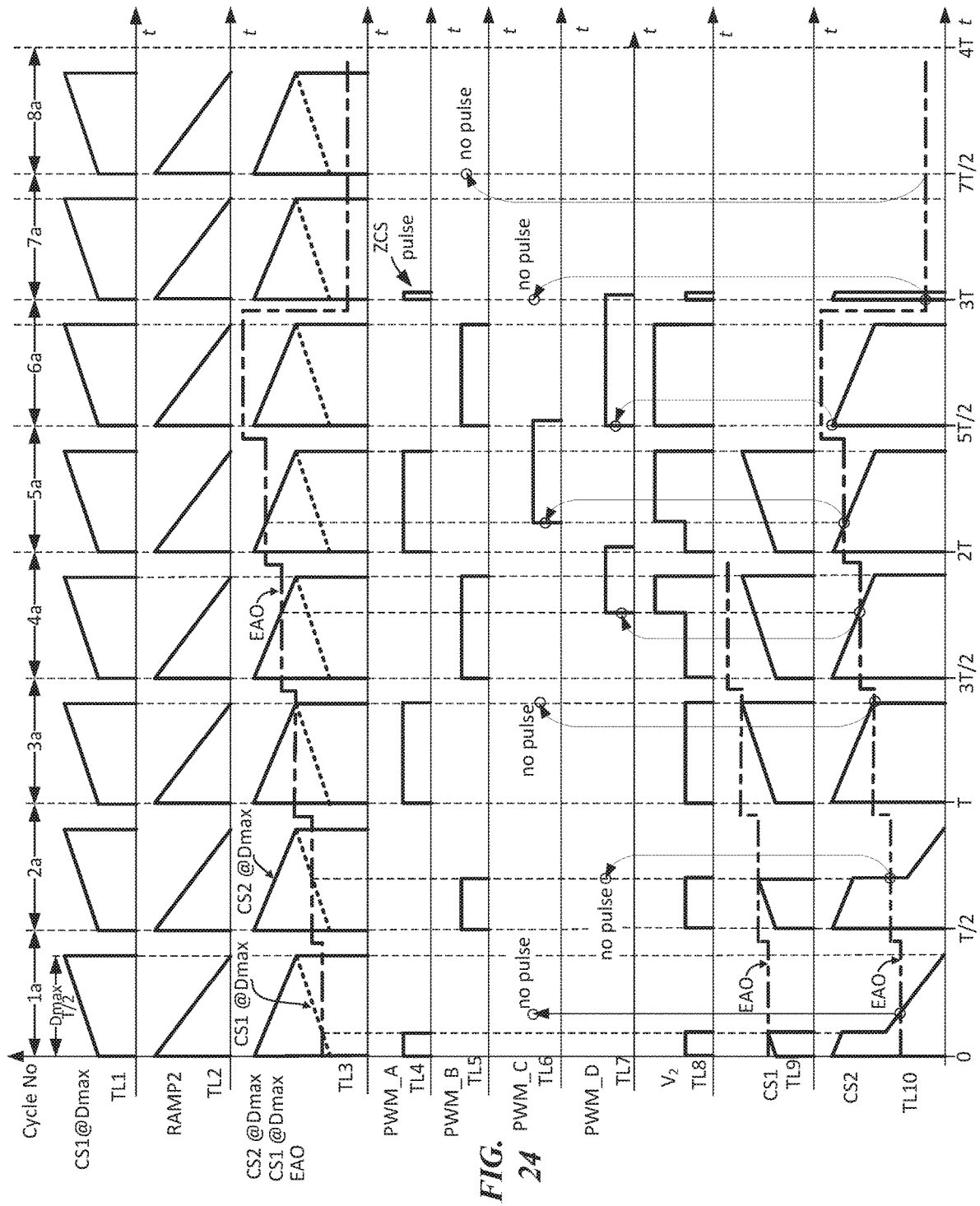
FIG. 24 depicts timing diagrams illustrating a method of operation of PWM control according to embodiments of the disclosure.

FIG. 24 shows a timing diagram of unified control operation. For illustrative purposes, the error amplifier output (EAO) is shown as a stepped signal, changing just before the beginning of the cycle (timelines TL3, TL9, TL10). Similarly, for illustrative purposes a modified current sense signal, including the ramp (CS1@Dmax) is shown as for the maximum duty cycle operation (timeline TL1, TL3). Descendant ramp (RAMP2, timeline TL2) has an amplitude adjusted to meet expected maximum slope of the CS1. Second current sense (CS2, CS2@Dmax) is a sum of the CS1 and RAMP2 (timelines TL3, TL10) and always is to have a descending slope. All three signals: CS1@Dmax, CS2@Dmax, EAO) were presented on the same diagram (timeline TL3) to show PWM tripping points of the first lagging edge PWM control and the second leading edge PWM control. As one can see, increasing EAO signal causes an increase of duty cycle of the first PWM signals (PWM_A, PWM_B, timelines TL4, TL5) up to the maximum duty cycle in cycle 3a. When the maximum duty cycle is reached and the EAO continues to increase, the second PWM control starts to shift the leading edge of active rectifier control signal (PWM_D, PWM_C, timelines TL6, TL7), thus increasing the output voltage (V2, timeline TL8) by adding wider and wider high voltage pulse. In various systems of primary current sense, the CS signal may disappear at the end of the duty cycle (timeline TL9). Then, the CS2 signal may have a stepped form (timeline TL10), which form may lead to unwanted launching of the active rectifier. Due to gating the output of the leading edge PWM comparators, the active rectifier is not launched until the duty cycle reaches a maximum (arrows to no pulse points). On the timeline TL10 one may see crossing of the CS2 signal and the EAO signal, while neither PWM_C nor PWM_D pulses are launched (cycles 1a, 2a, 3a). The active rectifier is activated on cycles 4a, 5a, 6a (signals PWM_C and PWM_D), and then pulses disappear again on cycles 7a and 8a. Since the EAO signal is lower than the CS1 at the beginning of the cycle 7a, normally no PWM_A (or PWM_B) pulse would be generated. Notably, since one of the switches in an active rectifier was activated (PWM_D) during the cycle 6a, the short pulse on PWM_A output is generated to accomplish ZCS phase of active rectifier. Since there was no activation of the active rectifier in cycle 7a, and the lagging edge comparator still commands not to start the pulse, the PWM_B does not appear in the cycle 8a. Notably, in such case the direction signal DIR is not changed. It may be concluded that the average output voltage increases seamlessly and proportionally to the EAO signal. During transition from the cycle with enabled active rectifier to a cycle with disabled active rectifier the commutating pulse of minimum width is generated on the PWM_A or PWM_B output, even if the lagging edge PWM control commands to skip the pulse.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings.

Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. In particular, all embodiments of the controls, described schematically by means of basic functions, may be implemented in a form of computer code or in digital hardware form. Thus, the claims set forth below are to be construed in view of the full breadth and spirit of the present disclosure as described herein.

What is claimed is:

1. An apparatus to provide direct current (DC) welding power, comprising:
   a component disposed to output a DC bus;
   a direct current-alternate current (DC-AC) power converter, the DC-AC converter disposed to receive the DC bus and to output a primary alternating current (AC) voltage;
   an isolation transformer stage to receive the primary alternating voltage from the DC-AC power converter on a primary side of the apparatus;
   an active rectifier circuit, the active rectifier circuit arranged on a secondary side of the apparatus and coupled to the isolating transformer stage; and
   a controller coupled to the active rectifier circuit and the DC-AC converter, wherein zero current switching (ZCS) takes place in the active rectifier circuit,
   wherein the controller comprises:
   a first pulse width modulation (PWM) system, wherein a position of a lagging edge of a control signal is modulated; and
   a second PWM system, wherein a position of a leading edge of a control signal is modulated including, and
   wherein a lagging edge PWM pulse is stored in a ZCS latch (e.g., D121) in accordance with a signal from an OR gate (e.g., D120), which sums set signals of PWM latches (e.g., D115, D116) that generate switching signals for the active rectifier circuit, and
   wherein a modulated version of an output of the ZCS latch is used to trigger outputs of PWM signals (e.g., D109, D110) supplied to the DC-AC power converter.

2. The apparatus of claim 1, wherein the active rectifier circuit comprises: a passive rectifier connected to a first set of secondary windings of the isolation transformer stage, and an active rectifier connected to a second set of secondary windings of the isolation transformer stage, wherein the active rectifier and the passive rectifier, deliver DC voltage to an output of the apparatus.

3. The apparatus of claim 1, further comprising:
   at least one current sensor, the at least one current sensor to directly measure output current; and
   at least one additional sensor, the at least one addition sensor configured to measure a physical quantity related to magnetizing flux in the isolation transformer stage.

4. A method of controlling a welding power supply, comprising:
   converting a direct current (DC) bus voltage using a primary converter to a primary alternating current (AC) voltage on a primary side of the welding power supply;
   transforming the primary AC voltage to a secondary AC signal; and
   rectifying the secondary AC signal to generate an output DC current using an active rectifier circuit,
   wherein zero current switching takes place in the active rectifier circuit,
   wherein a lagging edge pulse width modulation (PWM) is applied using a lagging edge PWM control system for control of the primary converter; and
   wherein a leading edge PWM is applied using a leading edge PWM control system for control of the active rectifier circuit,
   wherein a lagging edge PWM pulse is stored in a ZCS latch (e.g., D121) in accordance with a signal from an OR gate (e.g., D120), which sums set signals of PWM latches that generate switching signals for the active rectifier circuit, and
   wherein a modulated version of an output of the ZCS latch is used to trigger outputs of PWM signals (e.g., D109, D110) supplied to the primary converter.

5. The method of the claim 4,
   wherein the lagging edge PWM control system and the leading edge PWM control system together control an output of the welding power supply by controlling one of: an output current, an output voltage and a function of the output current and output voltage, and
   wherein the lagging edge PWM control system and the leading edge PWM control system are driven by a common feedback signal.

6. The method of the claim 5,
   wherein the lagging edge PWM control system is arranged to increase a duty cycle from zero to a predefined maximum duty cycle, following an increase of a feedback signal, and wherein after reaching the predefined maximum duty cycle by a lagging edge PMW signal, the leading edge PWM control system decreases a shift of a leading edge from a shift equal to a predefined maximum duty cycle of the lagging edge PWM signal towards zero, following an additional increase of a feedback signal.

7. The method of claim 4,
   wherein after a predefined level of output current or a predefined level of power is met, an increase in a shift of a leading edge PWM signal occurs, following an increase of the output current, wherein the increase of the shift of the leading edge PWM signal provides a limitation of one of: an output voltage and an output power.

8. The method of claim 4,
wherein the lagging edge (PWM) comprises generating a series of signals characterized by a lagging edge PWM duty cycle, wherein the lagging edge PWM duty cycle is limited by at least one of: currents in switching devices of the welding power supply, output current of the welding power supply, welding power and magnetic flux,
wherein the lagging edge PWM control system decreases the lagging edge PWM duty cycle when a predefined level is reached, wherein the predefined level comprises one of: a level of currents in the switching devices of the welding power supply, a level of output current of the welding power supply, a level of welding power, and a level of magnetic flux.

9. The method of the claim 4,
wherein the lagging edge PWM control system controls one of: an output by controlling output current, output voltage and a function of the output current and the output voltage, and wherein the leading edge PWM control system does not employ a feedback signal controlling the lagging edge PWM control system.

10. The method of claim 9,
wherein the lagging edge PWM control system generates a series of signals characterized by a lagging edge PWM duty cycle, while the lagging edge PWM control system generates a series of signals characterized by a shift of a leading edge PWM signal, wherein below a predefined level of the lagging edge PWM duty cycle, an increase in a shift of the leading edge PWM signals occurs, causing an increase of the lagging edge PWM duty cycle, until the lagging edge PWM duty cycle is equal to the predefined level or is lower than a shift of a leading edge PWM, and
wherein above the predefined level of the lagging edge PWM duty cycle, a shift of the leading edge decreases to a value defined by a limitation of output power or output voltage.

11. The method of claim 4, wherein a leading edge PWM signal generated by the leading edge PWM control system does not commence in an absence of a lagging edge PWM signal generated by the lagging edge PWM control system.

12. The method of claim 4, wherein during switching off of the welding power supply the primary converter is not switched off before switches of the active rectifier circuit are switched off.

13. The method of claim 4,
wherein the leading edge PWM control system generates two series of leading edge PWM signals,
wherein the lagging edge PWM control system generates two series of lagging edge PWM signals, wherein a leading edge PWM signal of a first series commences with a regulated shift in relation to a beginning of a lagging edge PWM signal of the first series and terminates on accomplishment of the zero current off switching (ZCS) of the active rectifier switch driven by this signal, and
wherein the zero current off switching is commenced on the beginning of a lagging edge PWM signal of a second series.

14. The method of claim 4,
wherein in a presence of a leading edge PWM signal, a plurality of lagging edge PWM signals of a minimum predefined time are generated independently of other conditions,
wherein the leading edge PWM signal is terminated after application of a lagging edge PWM signal to the primary converter,
wherein zero current off switching conditions are generated in a switch of the active rectifier circuit driven by the leading edge PWM signal.

15. The method of claim 14,
wherein termination of a leading edge PWM signal takes place under zero current condition in a switch driven by the leading edge PWM signal,
wherein a zero current condition is defined by one of: a current sense, a voltage sense, and a time delay, wherein time is fixed or current dependent.

\* \* \* \* \*